United States Patent
Oxstrand et al.

(10) Patent No.: US 11,126,789 B2
(45) Date of Patent: Sep. 21, 2021

(54) METHOD TO CONVERT A WRITTEN PROCEDURE TO STRUCTURED DATA, AND RELATED SYSTEMS AND METHODS

(71) Applicant: Battelle Energy Alliance, LLC, Idaho Falls, ID (US)

(72) Inventors: Johanna H. Oxstrand, Idaho Falls, ID (US); Katya L. Le Blanc, Idaho Falls, ID (US); Ahmad Y. Al Rashdan, Ammon, ID (US); Aaron Bly, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 90 days.

(21) Appl. No.: 16/222,730

(22) Filed: Dec. 17, 2018

(65) Prior Publication Data
US 2019/0213245 A1 Jul. 11, 2019

Related U.S. Application Data

(60) Provisional application No. 62/609,058, filed on Dec. 21, 2017.

(51) Int. Cl.
| | |
|---|---|
| *G06F 40/143* | (2020.01) |
| *G06F 16/22* | (2019.01) |
| *G06N 20/00* | (2019.01) |
| *G06Q 10/10* | (2012.01) |
| *G06Q 10/06* | (2012.01) |
| *G06F 40/211* | (2020.01) |

(Continued)

(52) U.S. Cl.
CPC ............ *G06F 40/143* (2020.01); *G06F 16/22* (2019.01); *G06F 40/131* (2020.01); *G06F 40/151* (2020.01); *G06F 40/211* (2020.01); *G06F 40/242* (2020.01); *G06F 40/279* (2020.01); *G06F 40/284* (2020.01); *G06N 20/00* (2019.01); *G06Q 10/0631* (2013.01); *G06Q 10/10* (2013.01); *G06Q 10/103* (2013.01)

(58) Field of Classification Search
CPC . G06F 40/211; G06Q 10/0631; G06Q 10/103
See application file for complete search history.

(56) References Cited

U.S. PATENT DOCUMENTS

| | | |
|---|---|---|
| 4,803,039 A | 2/1989 | Impink, Jr. et al. |
| 4,815,014 A | 3/1989 | Lipner et al. |
| | (Continued) | |

FOREIGN PATENT DOCUMENTS

EP    0314780 A1    5/1989

OTHER PUBLICATIONS

Wieringa et al., "Procedure Writing Across Domains: Nuclear Power Plant Procedures and Computer Documentation", ACM 089791-452-X/91/0010/0049 (1991) pp. 49-58.

(Continued)

*Primary Examiner* — Shaun Roberts
(74) *Attorney, Agent, or Firm* — TraskBritt

(57) ABSTRACT

Various embodiments described in this disclosure relate to methods and computer-based systems that implement those methods for converting tasks performed as part of a procedure into dynamic procedure tasks. Such dynamic procedure tasks may be used by computer-based procedure solutions to create highly dynamic computer-based procedures.

27 Claims, 35 Drawing Sheets

(51) Int. Cl.
  G06F 40/131      (2020.01)
  G06F 40/151      (2020.01)
  G06F 40/242      (2020.01)
  G06F 40/279      (2020.01)
  G06F 40/284      (2020.01)

(56) References Cited

U.S. PATENT DOCUMENTS

| | | | | |
|---|---|---|---|---|
| 5,634,039 | A | 5/1997 | Simon et al. | |
| 8,135,484 | B2 | 3/2012 | Yamazaki et al. | |
| 10,339,122 | B2* | 7/2019 | Lagos | G06F 40/289 |
| 2005/0188305 | A1* | 8/2005 | Costa | G06F 16/93 715/234 |
| 2005/0234955 | A1* | 10/2005 | Zeng | G06F 16/355 |
| 2005/0240555 | A1* | 10/2005 | Wilde | G06F 40/154 |
| 2006/0149770 | A1* | 7/2006 | Jang | G06F 40/197 |
| 2007/0118391 | A1* | 5/2007 | Malaney | G06Q 40/02 382/229 |
| 2007/0282892 | A1* | 12/2007 | Probst | G06F 40/20 |
| 2010/0050065 | A1* | 2/2010 | Hooks | G06Q 10/10 715/205 |
| 2011/0202468 | A1* | 8/2011 | Crowell | G06Q 10/103 705/301 |
| 2013/0197899 | A1* | 8/2013 | Roulland | G06F 11/0733 704/9 |
| 2013/0294560 | A1* | 11/2013 | Graham | G21C 17/00 376/216 |
| 2016/0162819 | A1* | 6/2016 | Hakman | G06Q 10/0633 705/7.27 |
| 2017/0061330 | A1* | 3/2017 | Kurata | G06F 16/355 |
| 2017/0117064 | A1* | 4/2017 | Lepine | G06Q 50/04 |
| 2017/0286766 | A1* | 10/2017 | Castelli | G06F 16/258 |
| 2018/0366235 | A1* | 12/2018 | Hanada | G05B 23/02 |

OTHER PUBLICATIONS

PPA AP-907-005.001, Rev 0. Functional Requirements for Advanced and Adaptive Smart Documents. Procedure Professionals Association, (Sep. 2017) 28 pages.

Oxstrand, "Nuclear Electronic Work Packages—Enterprise Requirements (NEWPER)", Idaho National Laboratory, Light Water Reactor Sustainability Program, (Jun. 2016) 17 pages.

Oxstrand, "Functional Requirements for an Electronic Work Package System", Idaho National Laboratory, Light Water Reactor Sustainability Program, INL/EXT-16-40501, Revision 0 (Dec. 2016) 51 pages.

Oxstrand, "From Binders to Tablets: Computer-Based Procedures for Field Workers", Idaho National Laboratory, Light Water Reactor Sustainability Program, (Jun. 2016) 13 pages.

Oxstrand, "Development of Utility Generic Functional Requirements for Electronic Work Packages and Computer-Based Procedures", NPIC&HMIT, San Francisco, CA, (Jun. 2017) pp. 1272-1281.

Oxstrand, "Computer-Based Procedures for Field Workers—Result and Insights from Three Usability and Interface Design Evaluations", Idaho National Laboratory External Report, INL/EXT-15-36658, Rev. 0, (Sep. 2015) 63 pages.

Oxstrand, "Computer Based Procedures: Insights From Field Evaluations at Nuclear Power Plants," Procedure Professionals Association Symposium, St. Petersburg, FL (Jun. 2015) 33 pages.

Oxstrand, "Computer Based Procedures: For Field Operators," 25th Annual Procedure Symposium, St. Petersburg, FL (Jun. 2013) 45 pages.

Oxstrand et al., "The Next Step in Deployment of Computer Based Procedures for Field Workers: Insights and Results From Field Evaluations at Nuclear Power Plants", Proceedings of the 9th Nuclear Plant Instrumentation, Control & Human-Machine Interface Technologies (NPIC&HMIT) topical meeting of the American Nuclear Society, Charlotte, NC, (Feb. 2015) 14 pages.

Oxstrand et al., "Supporting the Industry by Developing a Design Guidance for Computer-Based Procedures for Field Workers", NPIC&HMIT, San Francisco, CA, (Jun. 2017) pp. 1282-1292.

Oxstrand et al., "Light Water Reactor Sustainability Program Automated Work Package Prototype: Initial Design, Development, and Evaluation", Idaho National Laboratory External Report, INL/EXT-15-35825, Rev. 0, (Jul. 2015) 54 pages.

Oxstrand et al., "Evaluation of Computer-Based Procedure System Prototype", Idaho National Laboratory External Report, INL/EXT-13-28226, Rev. 1, (Jan. 2013) 65 pages.

Oxstrand et al., "Evaluation of Computer-Based Procedure System Prototype", Idaho National Laboratory External Report, INL/EXT-12-27155, Rev. 0, (Sep. 2012) 69 pages.

Oxstrand et al., "Computer-Based Procedures for Field Workers: Results From Three Evaluation Studies", Idaho National Laboratory External Report, INL/EXT-13-30183, Rev 0, (Sep. 2013) 53 pages.

Oxstrand et al., "Computer-Based Procedures for Field Workers in Nuclear Power Plants: Development of a Model of Procedure Usage and Identification of Requirements", Idaho National Laboratory External Report, INL/EXT-12-25671, Rev. 0, (Apr. 2012) 95 pages.

Oxstrand et al., "Computer-Based Procedures for Field Workers—Identified Benefits", U.S. Department of Energy, Office of Nuclear Energy, Light Water Reactor Sustainability Program, INL/Ext-14-33011, Revision 0, (Sep. 2014) 14 pages.

Oxstrand et al., "Computer-Based Procedures for Field Activities: Results from Three Evaluations at Nuclear Power Plants", Idaho National Laboratory External Report, INL/EXT-14-33212, Rev. 0, (Sep. 2014) 56 pages.

Oliveira et al., "Applying Computer-Based Procedures in Nuclear Power Plants," 2009 International Nuclear Atlantic Conference, Rio de Janeiro, Brazil , ISBN: 978-85-99141-03-8, (Sep. 2009) 12 pages.

O'Hara et al., "Human-System Interface Design Guidelines", US Nuclear Regulatory Commission, Washington, DC, NUREG-0700, Rev. 2, (May 2002) pp. 201-400, part 2 of 3.

O'Hara et al., "Human-System Interface Design Guidelines", US Nuclear Regulatory Commission, Washington, DC, NUREG-0700, Rev. 2, (May 2002) 224 pages, (including pp. 1-200) part 1 of 3.

O'Hara et al., "Human-System Interface Design Guidelines", US Nuclear Regulatory Commission, Washington, DC, NUREG-0700, Rev. 2, (May 2002) 197 pages (including pp. 401-545) part 3 of 3.

O'Hara et al., "Computer-Based Procedure Systems: Technical Basis and Human Factors Review Guidance", US Nuclear Regulatory Commission, Washington, DC, NUREG/CR-6634, (Mar. 2000) 148 pages.

Le Blanc et al., "Requirements for computer based-procedures for nuclear power plant field operators: results from a qualitative study", Proceedings of the 3rd International Conference on NPP Life Management (PLIM) for Long Term Operations (LTO), Salt Lake City, Utah, (May 2012) 9 pages.

Le Blanc et al., "Model of procedure usage—results from a qualitative study to inform design of computer-based procedures", Proceedings of the Seventh American Nuclear Society International Topical Meeting on Nuclear Plant Instrumentation, Control and Human-Machine Interface Technologies NPIC&HMIT, San Diego, California, (Jul. 2012) 12 pages.

Le Blanc et al., "Computer-Based Procedures for Nuclear Power Plant Field Workers: Preliminary Results From Two Evaluation Studies", Proceeding of the Human Factors and Ergonomics Society Annual Meeting, vol. 57, Issue 1, (Sep. 2013) 5 pages.

Le Blanc et al., "A model of operator interaction with field procedures: insights for computer-based procedures", Proceedings of the 56th Annual Meeting of the Human Factors and Ergonomics Society, vol. 56, No. 1. (Oct. 2012) pp. 2031-2035.

Bly et al., "Implementing Computer-Based Procedures: Thinking Outside the Paper Margins", NPIC&HMIT San Francisco, CA, (Jun. 2017) pp. 1005-1012.

"IEEE Guide for Human Factors Applications of Computerized Operating Procedure Systems (COPS) at Nuclear Power Generating Stations and Other Nuclear Facilities," IEEE Standards Association 1786-2011 , IEEE Power & Energy Society, (Sep. 2011) 38 pages.

* cited by examiner 1.3 Record the outside temperature: _____
1.4 IF outside temperature is ≤ 45°F, perform the following:
   1.4.1 Ensure HEATER 123 toggle switch is in the "ON" position
   1.4.2 Wait at least 60 seconds
1.5 IF outside temperature is > 45°F, ensure the HEATER 123 toggle switch is in the "OFF" position.

```
<Instructions>
  <Step>
    <Id>3</Id>
    <Description>Record the outside temperature:</Description>
    <Number>1.3</Number>
    <Order>3</Order>
    <Complete>false</Complete>
    <Active>false</Active>
    <SecTitle>false</SecTitle>
    <ActionType>Single</ActionType>
    <Action>
      <Input>
        <InputType>Numeric</InputType>
          <Min>-100</Min>
          <Max>150</Max>
          <Units>F</Units>
        <LookupName>OutsideTemp</LookupName>
```

1.3 Record the outside temperature: ____
1.4 IF outside temperature is ≤ 45°F, perform the following:
    1.4.1 Ensure HEATER 123 toggle switch is in the "ON" position
    1.4.2 Wait at least 60 seconds
1.5 IF outside temperature is > 45°F, ensure the HEATER 123 toggle switch is in the "OFF" position.

1400

```
<Instructions>
  <Step>
    <Id>3</Id>
    <Description>Record the outside temperature:</Description>
    <Number>1.3</Number>
    <Order>3</Order>
    <Complete>false</Complete>
    <Active>false</Active>
    <SecTitle>false</SecTitle>
    <ActionType>Single</ActionType>
    <Action>
      <Input>
        <InputType>Numeric</InputType>
        <Min>-100</Min>
        <Max>150</Max>
        <Units>F</Units>
        <LookupName>OutsideTemp</LookupName>
```

*FIG. 14B*

1.3 Record the outside temperature: _____
1.4 IF outside temperature is ≤ 45°F, perform the following:
    1.4.1 Ensure HEATER 123 toggle switch is in the "ON" position
    1.4.2 Wait at least 60 seconds
1.5 IF outside temperature is > 45°F, ensure the HEATER 123 toggle switch is in the "OFF" position.

1400

```
<Step>
    <Id>4</Id>
    <Description>Ensure HEATER 123 toggle switch is in the "ON" position</Description>
    <Number>1.4.1</Number>
    <Order>4</Order>
    <Complete>false</Complete>
    <Active>false</Active>
    <SecTitle>false</SecTitle>
    <ActionType>Single</ActionType>
    <Action>
        <Input>
            <InputType>Button</InputType>
            <BtnText>Mark ON</BtnText>
            <BtnTextPressed>ON</BtnTextPressed>
        </Input>
    </Action>
```

FIG. 14F

1.3 Record the outside temperature: _____
1.4 IF outside temperature is ≤ 45°F, perform the following:
    1.4.1 Ensure HEATER 123 toggle switch is in the "ON" position
    1.4.2 Wait at least 60 seconds
1.5 IF outside temperature is > 45°F, ensure the HEATER 123 toggle switch is in the "OFF" position.

1400

```
<Step>
    <Id>4</Id>
    <Description>Ensure HEATER 123 toggle switch is in the "ON" position</Description>
    <Number>1.4.1</Number>
    <Order>4</Order>
    <Complete>false</Complete>
    <Active>false</Active>
    <SecTitle>false</SecTitle>
    <ActionType>Single</ActionType>
    <Action>
        <Input>
            <InputType>Button</InputType>
            <BtnText>Mark ON</BtnText>
            <BtnTextPressed>ON</BtnTextPressed>
        </Input>
    </Action>
```

FIG. 14G 1.3 Record the outside temperature: _____
1.4 IF outside temperature is ≤ 45°F, perform the following:
    1.4.1 Ensure HEATER 123 toggle switch is in the "ON" position
    1.4.2 Wait at least 60 seconds
1.5 IF outside temperature is > 45°F, ensure the HEATER 123 toggle switch is in the "OFF" position.

1400

```
<Step>
    <Id>4</Id>
    <Description>Ensure HEATER 123 toggle switch is in the "ON" position</Description>
    <Number>1.4.1</Number>
    <Order>4</Order>
    <Complete>false</Complete>
    <Active>false</Active>
    <SecTitle>false</SecTitle>
    <ActionType>Single</ActionType>
    <Action>
        <Input>
            <InputType>Button</InputType>
            <BtnText>Mark ON</BtnText>
            <BtnTextPressed>ON</BtnTextPressed>
        </Input>
    </Action>
```

FIG. 14H 1.3 Record the outside temperature: _____
1.4 IF outside temperature is ≤ 45°F, perform the following:
    1.4.1 Ensure HEATER 123 toggle switch is in the "ON" position
    1.4.2 Wait at least 60 seconds
1.5 IF outside temperature is > 45°F, ensure the HEATER 123 toggle switch is in the "OFF" position.

1400

```
<Step>
    <Id>4</Id>
    <Description>Ensure HEATER 123 toggle switch is in the "ON" position</Description>
    <Number>1.4.1</Number>
    <Order>4</Order>
    <Complete>false</Complete>
    <Active>false</Active>
    <SecTitle>false</SecTitle>
    <ActionType>Single</ActionType>
    <Action>
        <Input>
            <InputType>Button</InputType>
            <BtnText>Mark ON</BtnText>
            <BtnTextPressed>ON</BtnTextPressed>
        </Input>
    </Action>
```

*FIG. 14I*

1.3 Record the outside temperature: _____
1.4 IF outside temperature is ≤ 45°F, perform the following:
    1.4.1 Ensure HEATER 123 toggle switch is in the "ON" position
    1.4.2 Wait at least 60 seconds
1.5 IF outside temperature is > 45°F, ensure the HEATER 123 toggle switch is in the "OFF" position.

1400

```
<Step>
    <Id>4</Id>
    <Description>Ensure HEATER 123 toggle switch is in the "ON" position</Description>
    <Number>1.4.1</Number>
    <Order>4</Order>
    <Complete>false</Complete>
    <Active>false</Active>
    <SecTitle>false</SecTitle>
    <ActionType>Single</ActionType>
    <Action>
        <Input>
            <InputType>Button</InputType>
            <BtnText>Mark ON</BtnText>
            <BtnTextPressed>ON</BtnTextPressed>
        </Input>
    </Action>
```

FIG. 14J

1.3 Record the outside temperature: _____
1.4 IF outside temperature is ≤ 45°F, perform the following:
    1.4.1 Ensure HEATER 123 toggle switch is in the "ON" position
    1.4.2 Wait at least 60 seconds
1.5 IF outside temperature is > 45°F, ensure the HEATER 123 toggle switch is in the "OFF" position.

```
</Step>
<Step>
    <Id>5</Id>
    <Description>Wait at least 60 seconds</Description>
    <Number>1.4.2</Number>
    <Order>5</Order>
    <Complete>false</Complete>
    <Active>false</Active>
    <SecTitle>false</SecTitle>
    <ActionType>Single</ActionType>
    <Action>
        <Timer>
            <Seconds>60</Seconds>
        </Timer>
    </Action>
</Step>
<Step>
```

*FIG. 14K*

1.3 Record the outside temperature: _____
1.4 IF outside temperature is ≤ 45°F, perform the following:
    1.4.1 Ensure HEATER 123 toggle switch is in the "ON" position
    1.4.2 Wait at least 60 seconds
1.5 IF outside temperature is > 45°F, ensure the HEATER 123 toggle switch is in the "OFF" position.

```xml
</Step>
<Step>
    <Id>5</Id>
    <Description>Wait at least 60 seconds</Description>
    <Number>1.4.2</Number>
    <Order>5</Order>
    <Complete>false</Complete>
    <Active>false</Active>
    <SecTitle>false</SecTitle>
    <ActionType>Single</ActionType>
    <Action>
        <Timer>
            <Seconds>60</Seconds>
        </Timer>
    </Action>
</Step>
<Step>
```

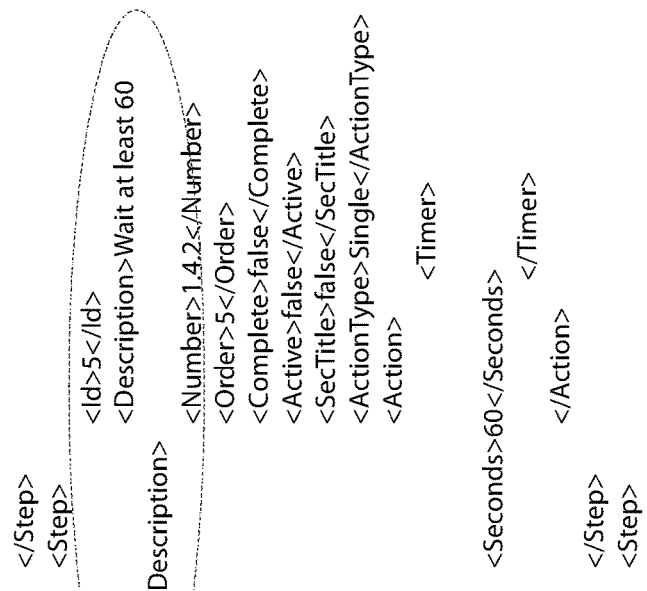

1.3 Record the outside temperature: _____
1.4 IF outside temperature is ≤ 45°F, perform the following:
    1.4.1 Ensure HEATER 123 toggle switch is in the "ON" position
    1.4.2 Wait at least 60 seconds
1.5 IF outside temperature is > 45°F, ensure the HEATER 123 toggle switch is in the "OFF" position.

```
</Step>
<Step>
    <Id>5</Id>
    <Description>Wait at least 60 seconds</Description>
    <Number>1.4.2</Number>
    <Order>5</Order>
    <Complete>false</Complete>
    <Active>false</Active>
    <SecTitle>false</SecTitle>
    <ActionType>Single</ActionType>
    <Action>
        <Timer>
            <Seconds>60</Seconds>
        </Timer>
    </Action>
</Step>
<Step>
```

FIG. 14M

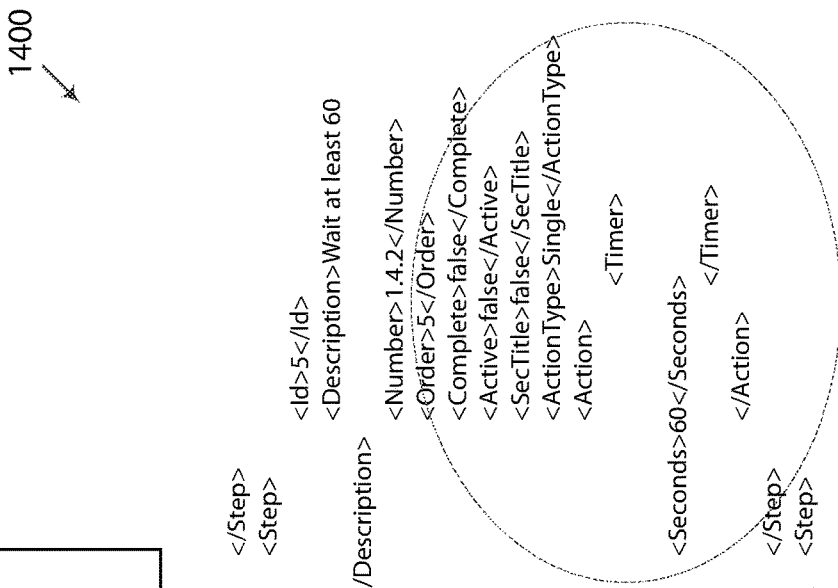

1.3 Record the outside temperature: _____
1.4 IF outside temperature is ≤ 45°F, perform the following:
   1.4.1 Ensure HEATER 123 toggle switch is in the "ON" position
   1.4.2 Wait at least 60 seconds
1.5 IF outside temperature is > 45°F, ensure the HEATER 123 toggle switch is in the "OFF" position.

```
</Step>
<Step>
    <Id>5</Id>
    <Description>Wait at least 60 seconds</Description>
    <Number>1.4.2</Number>
    <Order>5</Order>
    <Complete>false</Complete>
    <Active>false</Active>
    <SecTitle>false</SecTitle>
    <ActionType>Single</ActionType>
    <Action>
        <Timer>
            <Seconds>60</Seconds>
        </Timer>
    </Action>
</Step>
<Step>
```

FIG. 14N 1.3 Record the outside temperature: _____
1.4 IF outside temperature is ≤ 45°F, perform the following:
    1.4.1 Ensure HEATER 123 toggle switch is in the "ON" position
    1.4.2 Wait at least 60 seconds
1.5 IF outside temperature is > 45°F, ensure the HEATER 123 toggle switch is in the "OFF" position.

1400

```
<Step>
    <Id>6</Id>
    <Description>Ensure HEATER 123 toggle switch is in the "OFF" position</Description>
    <Number>1.5</Number>
    <Order>5</Order>
    <Complete>false</Complete>
    <Active>false</Active>
    <SecTitle>false</SecTitle>
    <ActionType>Single</ActionType>
    <Action>
        <Input>
            <InputType>Button</InputType>
            <BtnText>Mark OFF</BtnText>
            <BtnTextPressed>OFF</BtnTextPressed>
        </Input>
    </Action>
</Step>
</Instructions>
```

*FIG. 14O*

METHOD TO CONVERT A WRITTEN PROCEDURE TO STRUCTURED DATA, AND RELATED SYSTEMS AND METHODS

CROSS-REFERENCE TO RELATED APPLICATIONS

This application claims the benefit under 35 U.S.C. § 119(e) of U.S. Provisional Patent Application Ser. No. 62/609,058, filed Dec. 21, 2017, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

Various embodiments described in this disclosure relate to computer-based procedures, and more specifically, techniques for converting written instructions to a dynamic procedure data structures that are usable by computer-based procedures.

BACKGROUND

Most jobs performed in a nuclear power plant are guided by procedures, which helps ensure safe and reliable operation of the plant. One prominent goal of the nuclear industry is to minimize the risk of human error. To achieve this goal one has to ensure that jobs are correctly and consistently performed. This is partly achieved by training and by a structured approach to job performance, which is provided by the procedures and work instructions.

Procedures are used in the nuclear industry to direct workers' actions in a defined sequence. One goal of procedures is to minimize the reliance on memory and choices made in the field. However, a procedure document may not contain sufficient information to successfully complete a job. Therefore, a worker might carry additional documents such as turnover sheets drawings, and other procedures to a work site.

The nuclear industry is operated with paper procedures like paper catalogs of the past. A field worker may carry a large stack of documents needed to complete a job to the field. While the paper procedures provide some measure of safety to the industry, there are limitations and drawbacks to paper procedures. Paper procedures are static (i.e., the content does not easily change after a document is printed), difficult to search, and rely heavily on a field worker's situational awareness and ability to consistently meet (often) high performance expectations.

For a paper procedure to remain applicable to a constantly changing environment in a plant, the procedure should be written to encompass multiple different scenarios. This also contributes to the volume and navigational complexity of paper procedures. A field worker must search through a large amount of irrelevant information to locate information applicable to a job at hand. This can take up valuable time a field worker could have spent on job performance, and may potentially lead to unintentional deviations and errors. Examples of other challenges related to use of paper procedures are management of multiple procedures, place keeping, finding a correct procedure for a job, and relying on other sources of information to ensure a functional and accurate understanding of a current plant status.

Computer-based procedures (CBPs) may reduce a stack of paper to the size of a tablet computer or a smart phone. Instead of manually matching equipment identification numbers listed in a procedure with a number on a physical equipment, a field worker may simply scan a barcode to ensure a correct valve is opened while simultaneously creating a record. Instead of manually navigating through a maze of cross-references, CBPs known to the inventors of this disclosure enable intelligent work path navigation that accounts for past decisions and observation, thereby enabling more efficient and safe task completion. A CBP system may provide a streamlined work process compared to paper procedures. CBP may also provide dynamic support to guide a field worker through a job performance, so they can focus on a job at hand rather than on a paper procedure.

By way of example, a typical CBP guides a field worker seamlessly through a logical sequence of a procedure. In addition, a CBP system may make use of inherent capabilities of technology, such as incorporating computational aids, easy access to additional information, just in time training, and correct component verification. A CBP system offers a more dynamic means of presenting procedures to a field worker, displaying only relevant steps based on operating mode, plant status, and task at hand. A dynamic presentation of a procedure guides a field worker down a path of relevant steps based on current conditions. Dynamic presentation reduces a field worker's workload and inherently reduces a risk of incorrectly marking a step as not applicable and a risk of incorrectly performing a step that should be marked as not applicable.

Instead of CPB, the nuclear industry has been transitioning to electronic work management (EWM) solutions. By way of example, a typical nuclear industry specific EWM solution presents a procedure to a field worker by various versions of electronic documents (e.g., a PDF document with hyperlinks and overlays) to streamline work processes, route the documentation to the relevant reviewers, gather approval signatures to authorize work, and efficiently archive the documentation when work in the field is complete.

Field workers access and use EWM procedures on handheld computer devices (e.g., a tablet computer). However, the inventors of this disclosure now understand that transitioning to, and using, EWM procedures has disadvantages and deficiencies. For example, using EWM procedures on handheld devices only marginally improves field worker performance compared to traditional paper procedures. In some cases, using electronic documents on a handheld device is less effective than using paper documents. Further, converting text to data is a highly manual and laborious process prone to error, which necessitates more laborious quality control.

Transitioning from written procedures to CBP can be a laborious process, and that may be one reason nuclear industry specific procedures have transitioned to EWM solutions, which is a comparatively simpler transition.

BRIEF DESCRIPTION OF THE DRAWINGS

Purposes and advantages of the embodiments of the disclosure will be apparent to one of ordinary skill in the art from the detailed description in conjunction with the appended drawings, including.

DETAILED DESCRIPTION

Figure 1:
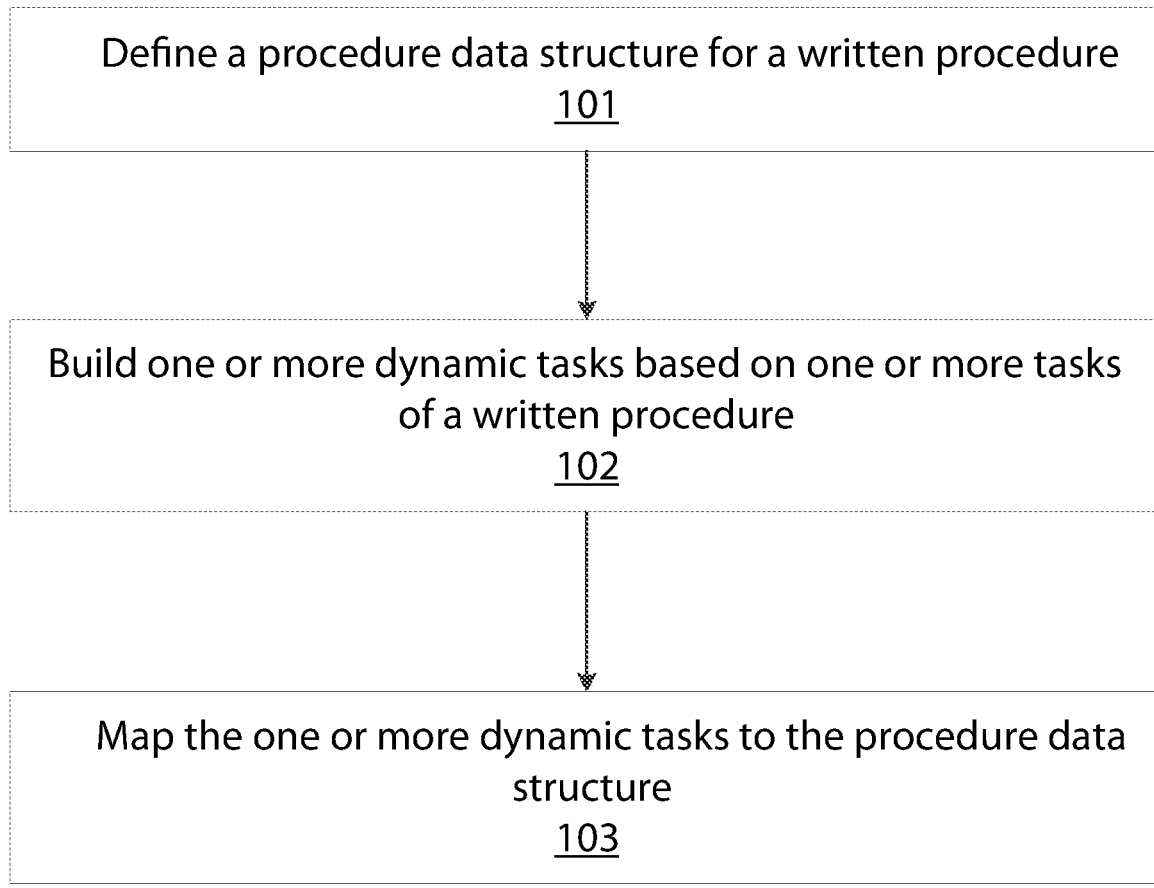
FIG. 1 shows a flowchart of a method to build a data structure of dynamic procedure tasks for a context-sensitive procedure, in accordance with an embodiment of the disclosure.

The following description provides specific details to provide a thorough description of various embodiments of the invention. However, one of ordinary skill in the art will understand that the disclosed embodiments may be practiced without using these specific details. Indeed, the disclosed embodiments may be practiced in conjunction with conventional systems and methods used in the industry. In addition, only those elements helpful to understand and enable one of ordinary skill in the art to practice the disclosed embodiments are described in detail. One of ordinary skill in the art will recognize that some elements not described herein but, using various conventional method components and acts, would be in accord with the embodiments of this disclosure.

The following description may include examples to help enable one of ordinary skill in the art to practice the disclosed embodiments. The use of the terms "exemplary," "by example," and "for example," means that the related description is explanatory and though the scope of the disclosure is intended to encompass the recited examples and their legal equivalents. The use of such terms is not intended to limit the scope of an embodiment or this disclosure to the specified components, steps, features, functions, arrangement of components, or the like. Moreover, the use of such terms does not indicate or imply that the related description comprises, or is, a preferred embodiment.

Any drawings accompanying this disclosure are for illustrative purposes only, and no scale is intended unless specifically indicated. Elements common among figures may retain the same numerical designation; however, the similarity in numbering does not mean that the structures or components are necessarily identical in size, composition, configuration, or any other property.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

As noted, above, specific implementations shown and described are only examples and should not be construed as the only way to implement the present disclosure unless specified otherwise herein. Elements, circuits, and functions may be shown in block diagram form in order not to obscure the present disclosure in unnecessary detail. Block definitions and partitioning of logic between various blocks is/are examples of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Many of the functional units described in this specification may be illustrated, described or labeled as logic, modules, engines, threads, or other segregations of programming code, to more particularly emphasize their implementation independence in accomplishing the features, functions, tasks or steps that are generally described herein. The various illustrative logical blocks, modules, and circuits described in connection with the embodiments disclosed herein may be at least partially implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

The functional units may be implemented using software or firmware, stored on a computer-readable storage medium, in system memory, or a combination thereof for execution by various types of processors. Some examples of languages that may be used to write the software include, but are not limited to, an extensible markup language, C, C++, JAVA, MATLAB, MINITAB, EXPRESS, DRAKON, DYNA, PYTHON, MOOSE, and RUBY. The software programs may be further translated into machine language or virtual machine instructions and stored in a program file in that form. The program file may then be stored on or in one or more of the articles of manufacture. Although enabling software might be "written on" a disc, "embodied in" an integrated circuit, "carried over" a communications circuit, "stored in" a memory chip, or "loaded in" a cache memory, it will be appreciated that, for the purposes of this application, the software is referred to simply as being "in" or "on" the computer readable medium. Thus, the terms "in" or "on" are intended to encompass the above mentioned and all equivalent and possible ways in which software can be associated with a computer readable medium.

In the case of a general-purpose computer, these logic and modules may be embodied in software classes and applications executed by processor cores, and while the modules are executing the general-purpose computer may be thought of as a special purpose computer or a specific purpose computer. The logic and modules may also relate to specific purpose hardware, including the firmware and machine code, controlling its operation. An identified module of executable code may, for instance, comprise one or more physical or logical blocks of computer instructions, which may, for instance, be organized as a thread, object, procedure, or function. Nevertheless, the executable code of an identified module need not be physically located together, but may comprise disparate instructions stored in different locations which, when joined logically together, comprise the module and achieve the stated purpose for the module.

A module of executable code may comprise a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the software portions are stored on one or more physical devices, which are referred to herein as computer-readable media.

In some embodiments, the software portions are stored in a non-transitory state such that the software portions or representations thereof, persist in the same physical location for a period of time. Additionally, in some embodiments, the software portions are stored on one or more non-transitory storage mediums, which include hardware elements capable of storing non-transitory states and/or signals representative of the software portions, even though other portions of the non-transitory storage mediums may be capable of altering and/or transmitting the signals. Examples of non-transitory storage mediums are flash memory and certain types of random-access memory (RAM). Another example of a non-transitory storage medium includes a read-only memory (ROM) which can store signals and/or states representative of the software portions for a period of time. However, the ability to store the signals and/or states is not diminished by further functionality of transmitting signals that are the same as, or representative of, the stored signals and/or states. For example, a processor may access the ROM to obtain signals that are representative of the stored signals and/or states to execute the corresponding software instructions.

A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer when the general-purpose computer is configured to execute computing instructions (e.g., software code) related to embodiments of the present disclosure.

The embodiments disclosed herein may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be rearranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Various embodiments described herein may include elements described as implemented in a "workstation," "computer," or a "computer system." Here, the terms "workstation," "computer," and "computer system" are to be understood to include at least one non-transitory computer-readable medium and at least one processing unit. In general, the storage medium will store, at one time or another, at least portions of an executable program code, and a processor(s) will execute one or more of the instructions included in that executable program code. It will be appreciated that the term "executable program code" and the term "software" mean substantially the same thing for the purposes of this description. It is not necessary to the practice of the various embodiments described herein that the storage medium and the processing unit be physically located in the same place. That is to say, it is foreseen that the processor and the memory might be distributed among physical pieces of equipment or even in geographically distinct locations. One of ordinary skill in the art will appreciate that "media," "medium," "storage medium," "computer-readable media," or "computer-readable medium" as used here, may include a diskette, a magnetic tape, a digital tape, a compact disc, an integrated circuit, a ROM, a CD, DVD, Blu-Ray, a cartridge, flash memory, PROM, a RAM, a memory stick or card, or any other non-destructive storage medium useable by computers, including those that are re-writable.

Although the enabling software might be "written on" a disc, "embodied in" an integrated circuit, "carried over" a communications circuit, "stored in" a memory chip, or "loaded in" a cache memory, it will be appreciated that, for the purposes of this disclosure, the software will be referred to simply as being "in" or "on" a main memory that is a computer-readable medium. Thus, the terms "in" or "on" are intended to encompass the above mentioned and all equivalent and possible ways in which software can be associated with a computer-readable medium.

Users may interact with the computer systems described herein by way of graphical user interfaces (GUIs) on a display and input devices such as touchscreens, keyboards, a computer mouse, touchpads, buttons, switches, jumpers, and the like. A GUI may include a console and/or dashboard and a user may interact with the GUI and, in turn, underlying software applications.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" about a given parameter, property, or condition means and includes, to a degree, that one of ordinary skill in the art would understand that the given parameter, property, or condition is met with a small degree of variance, such as, for example, within acceptable manufacturing tolerances. By way of example, depending on the parameter, property, or condition that is substantially met, the parameter, property, or condition may be at least 90% met, at least 95% met, or even at least 99% met.

As used herein, "task" means a step of a procedure. Steps in written procedures are typically written as instructions for how a job should be performed. Tasks in a procedure may be referred to herein as "procedure tasks" or just "tasks."

As used herein "action(s)" means a physical act or acts to be performed by a worker in accordance with an instruction task (i.e., step) of a procedure. Examples of actions include inputting data, reading gauges on equipment, turning equipment on or off, open or closing valves, clearing a warning, and verifying components. Actions may be both explicit and implicit.

As used herein "structured data" means data that resides in a field within an electronic record or electronic file, including, without limitation, data in a relational data base, data in a spread sheet, and data in an encoded document (e.g., a document encoded a markup language such as XML).

One or more embodiments described herein relate, generally, to building a set of dynamic procedure tasks from, at least in part, a set of static procedure tasks. In one embodiment, the set of static procedure tasks may be based on a written procedure, and the set of dynamic procedure tasks may be usable with a CBP solution. So, one or more of the embodiments described herein may also relate to converting a written procedure to a format that is usable in a CBP solution.

One or more embodiments described herein relate, generally, to converting text of a written procedure to data and a data structure. Learnings algorithms may be trained to classify raw text and convert the raw text to classified data. A multi-tuning process may be applied to the classified data. In one embodiment of a multi-tuning process, the classified data may be added to a classified data list that is continuously tuned to a written procedure. Further, a classified data list may also be continuously tuned using dictionary data bins of dictionary text. A multi-tuning approach reduces bias toward working data (here, the written procedure text) that is inherent in conventional techniques, such as parsing. Further, it serves to increase the confidence of learning algorithms that a word is valid, however, it does not serve to decrease confidence since (i.e., notwithstanding that . . . ) many non-standard words (e.g., acronyms, esoteric terms, etc.) are used in written procedures.

In this disclosure, at times a distinction is made between "static" procedures and "dynamic" procedures. Dynamic procedures, and dynamic tasks of such procedures, include dynamic elements (by way of example, described in a procedure data structure) that enable dynamic features and work flow at a CBP, which in turn enable a rich interaction with a user (as compared, for example, to a written procedure). Dynamic elements may include, for example, decision points, dynamic data fields that are updated by, or update, information recorded at other tasks, task hiding (hiding tasks that are not relevant to a user), references to other tasks, and the like. Static procedures either lack these elements or do not fully realize their potential due to inherent limitations in the environment in which they are used (e.g., written documents and EWM solutions). For avoidance of doubt, the terms "dynamic" and "static" are used herein as convenient descriptors, and while this disclosure is intended to encompass the concepts, structures, elements, features, or other aspects of these descriptors as understood by one of ordinary skill in the art, the disclosure is not limited to such concepts, structures, elements, features or other aspects.

FIG. 1 shows a flowchart of a process 100 for building dynamic procedure tasks from a written procedure, in accordance with one or more embodiments of the disclosure. In operation 101, a procedure data structure is defined for a written procedure. In operation 102, one or more dynamic tasks are built based on one or more tasks of a written procedure. In operation 103, the dynamic tasks are mapped to the procedure data structure.

Generally, a procedure data structure definition provides a means of converting a procedure into a format usable by any CBP compatible with the procedure data structure definition (e.g., compatible in terms of format and structure). In one embodiment, a procedure data structure does not "tell" a CBP solution how to display information, it provides the information that needs to be displayed. This separation enables a procedure data structure to be used between CBP solutions while each CBP solution displays a procedure according to its programming as long as it contains the information that the procedure data structure dictates. So, for example, the same CBP may be run on different devices with different user interfaces (UI) and display format requirements based on the same procedure data structure, and each CBP solution may manage the UI and display a procedure differently. This enables flexibility as to device vendor. Also, users may share procedures, if appropriate, across job sites, facilities, utilities, etc., even if they are employing a different CBP solution, the procedure will work in their system.

In one or more embodiments described herein, a procedure data structure may be an extensible markup language (XML) schema that is part of an XML document, i.e., the XML schema may define elements, attributes, and data types of an XML document. When implemented, a procedure data structure may be an XML document defined by the XML schema. One of ordinary skill in the art will recognize other means for delivering a procedure to a CBP system, such as other data structure formats (e.g., JavaScript Object Notation, Comma-Separated Values, etc.), as well as a database that stores a procedure structure.

Figure 2:
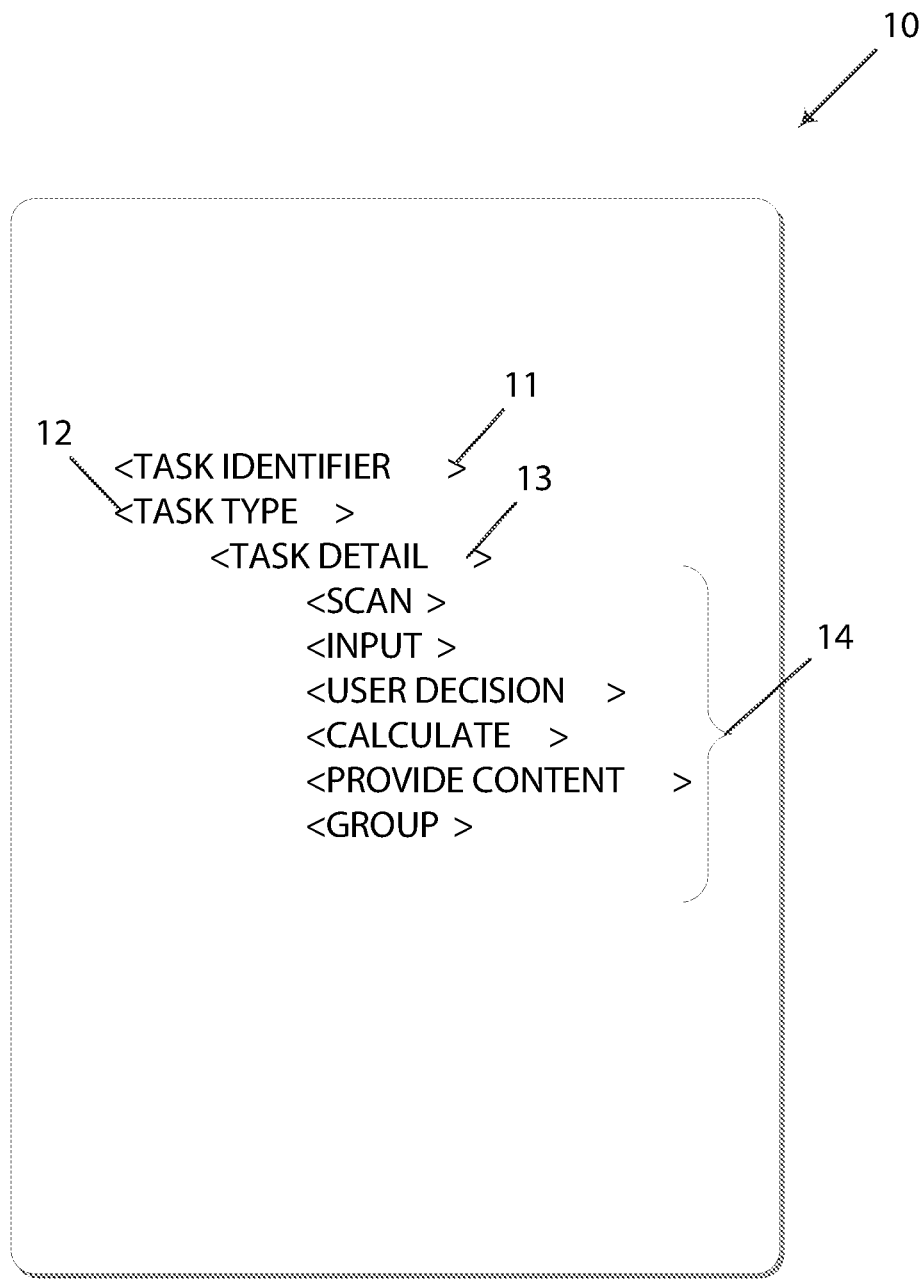
FIG. 2 shows an example definition for a dynamic procedure data structure, in accordance with an embodiment of the disclosure.

FIG. 2 shows an example procedure data structure definition 10, in accordance with one or more embodiments of the disclosure. In contemplated conversion processes, a procedure data structure definition may be provided or may be predetermined according to techniques known to those having ordinary skill in the art.

Procedure data structure definition 10 may include task identifier 11, task type 12, and task details 13. Task details 13 may include task related actions 14 that, generally, describe or relate to a type of interaction a user should have with a procedure, and how to handle user interaction (e.g., how to update a CBP system, how a CBP system should direct task-flow, etc.). In the example shown in FIG. 2, task related actions 14 include: scan, input, user decision, calculate, information, and multi-input. Additional information attributes enable a CBP to do more than just recreate a written procedure in an electronic form—it enables a CBP to expect user actions and to provide dynamic content, in other words, it enables a CBP system to be interactive.

Each compatible CBP system may be programmed to handle each action defined in a procedure data structure definition 10. So, a procedure data structure does not actually "know" how a particular CBP will handle an action. Example definitions of task related actions 14 are provided in Table 1, below:

| Task Related Action | Definition |
| --- | --- |
| Scan | Indicates a need to perform a CCV in order to make sure the user is on the correct component before performing the other action that the step states. |
| Input | Collect data for a procedure to continue and to provide information to a user. Inputs may be collected from a user or retrieved from external sources from the CBP system - e.g. plant status or actions being performed simultaneously by other procedures that affect what the user needs to do in the current procedure |
| User Decision | Binary question to provide the user with context and to simplify the procedure for the user |
| Calculate | Calculation result to provide, or perform and provide, to the User based on Inputs |
| Multi-Input | A group of similar or related inputs, decisions, or calculations |
| Information | Provide access to content such as reference materials |

In some cases, a written procedure may already be converted to data (e.g., text strings, mark-ups, etc.) when it is processed and migrated to a procedure data structure. In other cases, a written procedure has not been converted to data.

Figure 3A:
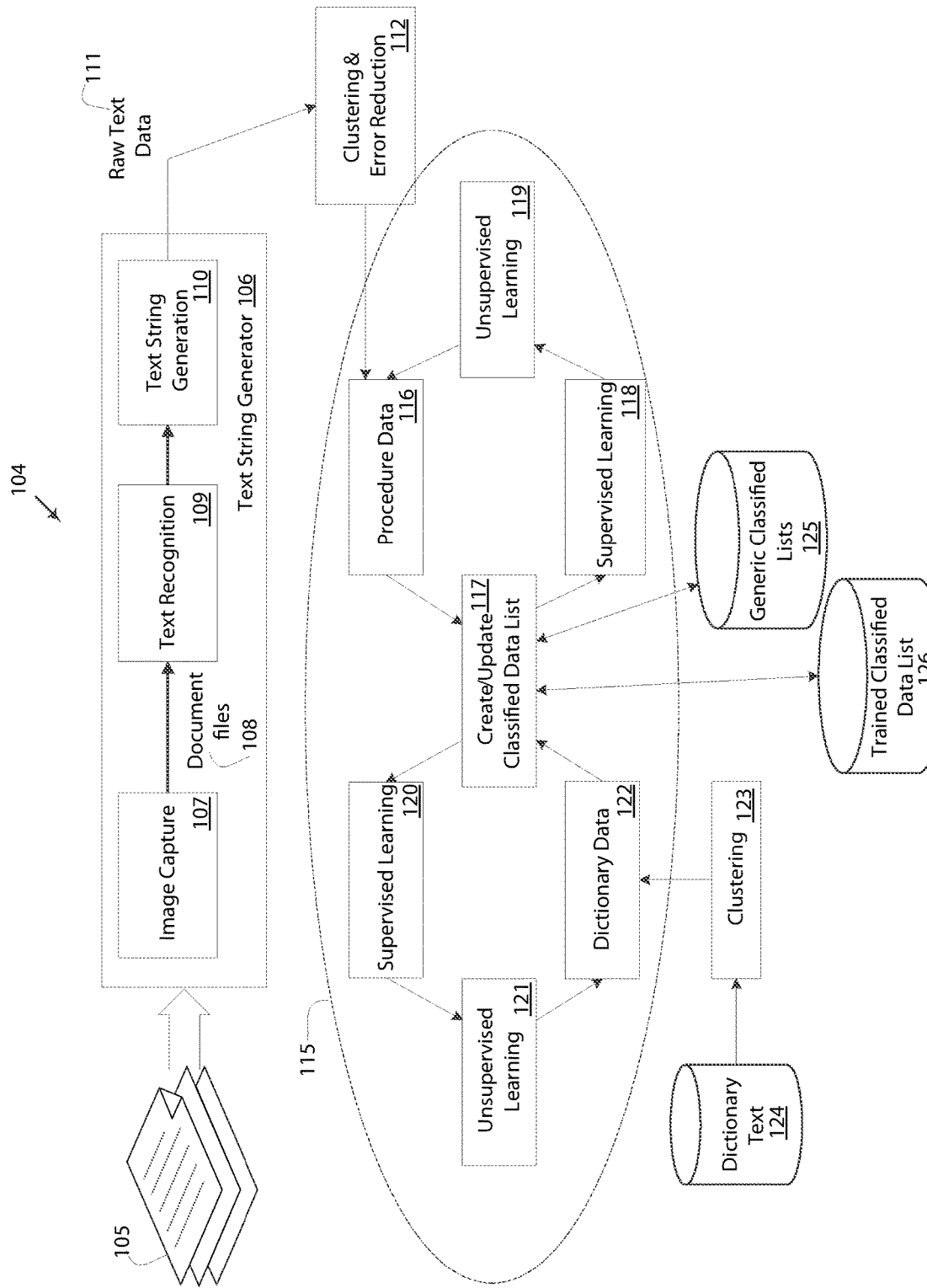
FIG. 3A shows a functional block diagram of a text-to-data conversion system 104, in accordance with one or more embodiments of the disclosure.

One or more embodiments of the disclosure relate, generally, to converting written procedures to data. FIG. 3A shows a text-to-data conversion system 104, in accordance with one or more embodiments of the disclosure. Text-to-data conversion system 104, generally, may be configured to convert written procedures to data, and more specifically, classified text. Text string generator 106 may be configured to receive written documents 105 and output raw text data 111, here, comprising text strings. Text string generator 106 may include image capture 107, text recognition 109 and text string generation 110. Image capture 107 receives written documents 105 and outputs image files 108 responsive to written documents 105. Text recognition 109 may be configured to receive the image files and, responsive to the received image files, output, for example, encoded images files that, for example, include machine encoded text. In one embodiment, text recognition 109 may be configured to perform optical character recognition (OCR) of image files. Text string generation 110 may be configured to output raw text data 111 for example, to an electronic storage (not shown), responsive to received encoded image files. One of ordinary skill in the art will recognize that other text and character recognition techniques may be used and are within the scope of this disclosure including, for example, Arabic Character Recognition, Handwriting Character Recognition, feature extraction methods more generally, and the like.

In one or more embodiments, text string generator 106 may be configured to output raw text data 111 responsive to written documents 105 of any suitable electronic file format. For example, written documents 105 may be formatted according to a page description language such as PostScript (PS), Printer Command Language (PCL), Scalable Vector Graphics (SVG), American Standard Code for Information Interchange (ASCII); or formatted according to an image file format such as Joint Photographic Experts Group (JPEG), TIFF (Tagged Image File Format), PNG (Portable Network Graphics), or GIF (Graphics Interchange Format). Some electronic file formats of written documents 105 may incorporate one or more aspects commonly associated with both page description languages and image formats, for example, Portable Document Format (PDF), Encapsulated PostScript (EPS), and Scalable Vector Graphics (SVG).

In one or more embodiments, a written procedure may be provided as an electronic file. For example, a procedure may be provided as an image or set of images or in a PS language, in which case image capture 107 would not be necessary. In another example, an electronic file may include text strings of procedure text, in which case, text string generator 106 may be configured to format/markup the text strings or may be not be necessary.

In one or more embodiments, one or more data preparation processes, such as error correction, may be performed on raw text data 111. Clustering and error reduction 112 may be configured to perform unsupervised clustering to words (e.g., as a sub-element of text of raw text data 111) responsive to their frequencies of occurrence. Words and/or groups of words may be binned, for example, using a bag of words model, self-organizing maps, or other suitable techniques. In one embodiment, clustering and error reduction 112 may incorporate hashing tables and/or binary trees to reduce computational requirements to process large amounts of raw text data 111. Clustering and error reduction 112 may also be configured to reduce text recognition errors using statistical methods and belief theory (e.g., uncertainty management). In one embodiment, clustering and error reduction 112 may be configured to rely on data-dependent auto-tuning error thresholds when comparing sparsely used words to frequently occurring words through a "one-letter-at-a-time"-based deviation technique.

In one or more embodiments, clustering 123 may be configured to receive dictionary text 124, and may be configured to perform clustering on dictionary text to extract words and groups of words 122. Extracted words and groups of words 122 may be used, generally, to increase confidence that words extracted from raw text data 111 are valid words. For example, if words or groups of words identified from raw text data 111 match (e.g., identical, are within a predefined threshold, etc.) words or groups of words extracted from dictionary text then a confidence factor may be increased for the words or groups of words identified from raw text data 111. In one or more embodiments, clustering and error reduction 112 and clustering 123 may output bins of text of lower dimensionality as compared to text of raw text data 111.

In one or more embodiments, data mining 115 may be configured, generally, to using learning algorithms to train classification models to classify raw text data 111 using classified data lists 126 as training data. Trained classified data lists 126 may be tuned 117 using a multi-tuning process. According to one aspect, classified data lists may be tuned 117 to one or more work procedures 116 that comprise raw text data 111 and, at various stages of tuning, generic classified data lists may be created that, for example, are specific to an industry or work procedure.

Moreover, in one or more embodiments, trained classified data lists 126 and/or learned classification models may be used to recognize and classify text in work procedures. In one or more embodiments, classifications may correspond to categories such as procedure-specific information, procedure-specific tasks, supplemental information, conditional step, component identifier, component verification, step identifier, action (explicit and implicit), input type, button text, and more. Classifications may also correspond to sub-categories of the categories, such as in the case of an "action" category: timer, single action, multiple action, bullet, and more.

In one or more embodiments, data mining 115 may be performed using binned text received from clustering and error reduction 112 and clustering 123. In the example embodiment shown in FIG. 3A, data mining 115 includes two concurrent tuning processes: data mining raw text data 111 of written document 105 to create trained classified data list 126; and data mining dictionary text data 124 to expand trained classified data list 126. Data mining 115 may start with one or more generic classified data lists 125. In one or more embodiments, generic classified data lists 125 and trained classified data list 125 include lists of text that may be used to train supervised learning processes (e.g., supervised learning process 118 and supervised learning process 120) to classify text into data, moreover, trained classified data list 126 is also an outcome of a data mining process 115. In one or more embodiments, an aspect of trained classified data list 126 and generic classified data list 125 is that they are not a static list like those typically used with conventional parsing techniques, but may continue to automatically grow as more words are classified. As generic classified data list 125 is used to classify words using supervised learning methods, results of supervised and unsupervised classification may be used to expand generic classified data list 125, and that process may be repeated. So, in one or more embodiments, an output of data mining 115 is a more finely tuned generic classified data list.

In one or more embodiments, binned text may classified using trained classified data list 126 and any suitable classification algorithm or combination of suitable classification algorithms. In one embodiment, binned text may be classified by performing a check for the binned text against trained classified data list 126. In another embodiment, a supervised learning method such as a Native Bayes Classifier or Support Vector Machine may be used to search for indirect word occurrences from trained classified data list 126 to serve as a classification criteria for criteria aggregation methods. In yet another embodiment, a word or set of words may be classified (i.e., as part of a data class) responsive to one or more variables, and the classification may be confirmed or rejected responsive to a decision tree or belief method.

For example, an equipment "23SV224" may be identified as mechanical equipment based on one or more of: a presence of training data that describe a context of a word, such as a mechanical action (e.g., unbolt), a tool (e.g., wrench), a context of surrounding step actions (e.g., grind), and a material (e.g., gasket), in addition to some parsing rules (e.g., "SV" represents valves tags). This type of example analysis requires dimension reduction techniques to determine what types of words fully describe a class within a work management system. In one or more embodiments, dimension reduction is performed such that adjectives or verbs describing a class are selected using non-greedy techniques such as least absolute shrinkage and selection operator.

If equipment "23SV224" is classified as a mechanical valve, it (i.e., the classification of "23SV224") may be used to create other conclusions about other words. However, since future word classifications use the same words that were used to classify equipment "23SV224," a criteria aggregation method suffers, due to data interdependency; therefore, results may lead to increasing misclassification. In one or more embodiments, this may be resolved by using techniques for reducing unnecessary interdependencies, such as backward elimination. Also, in this stage (i.e., eliminating unnecessary interdependencies), context-independent words that are supplemental to text, such as "the" and "is," are isolated. In one embodiment, a form of a technique for removing so called "stop words" in natural language processing may be used to isolate context-independent words. These words may be identified as having extremely high frequency and widespread occurrence with no strong correlation to other words, in conjunction with standard libraries of known stop words. A randomness threshold for identifying such words may be inserted to an algorithm or automatically tuned based on the data behavior. Additionally, words that are either synonyms or derivatives of root words, (e.g., gerunds, plurals, and possessives) may be "stemmed" to provide consistent frequencies of a given word or meaning.

In one or more embodiments, in parallel to supervised learning process performed by supervised learning 118 and/or 120, unsupervised learning by association clustering (e.g., Gaussian mixture models) may be performed to include classification of unclassified words without knowing a classification context. In one or more embodiments, unsupervised learning 119 and 121 may be configured to use a set of variables to expand a class definition to unclassified words (e.g., words not classified by supervised learning techniques). In one embodiment, this may be based, at least in part, on a combination of a word2vec algorithm and the k-means algorithm. In a contemplated operation, a word2vec algorithm assigns a distance metric to each word in relation to other words, while a k-means algorithm classifies words into groups dictated by the distance metric(s). For example, if an unsupervised classification variable is identified as "a distance in words between two words," then the words "torque" and "wrench" in the phrase "torque wrench" are deemed to be associated, since the text will show high occurrence at zero distance, indicating that these two words are strongly associated. This would inform the data mining process 115 that "torque" is part of the "wrench" class.

Raw text data 111 and dictionary text 124 may be iteratively processed by data mining 115. Over time, trained classified data list 126 will grow. The more iterations performed, the higher the convergence of the words in trained classified data list 126 to mining all data elements of a written procedure.

In one embodiment, restrictions may be built into a classification process such that a tuned classified data list may be stored with generic classified data lists 125. That is, a data mining process 115 may "improve" generic classified data lists 125. In one embodiment, a restriction may be based on a classified data list size, words per data element, or another suitable metric or combination of suitable metrics.

In one embodiment, results of iterative classification process may expand from a few words to multiple words patterns as fewer words are classified by the iterative process. When a trained classified data list 126 is updated, a quantity of procedure text of raw text data 111 will shrink and a quantity of classified data of trained classified data list 126 will expand.

In one or more embodiments, one or more of generic classified data lists 125, trained classified data list 126, dictionary text 124, and data created from data mining process 115 may be stored in one or more databases according to relational data structures.

In one or more embodiments, organizational relationships between procedure text and a written procedure may be preserved with trained classified data list 126. Supervised learning rules used by supervised learning 120 and/or supervised learning 118 may, among other things, describe meaning associated with one or more of layout design elements (e.g., indenting, bullet lists, numbered lists, ordered lists, and tables), a section identifier scheme (e.g., section numbers, sub-section numbers, and paragraph numbering), a font type (e.g., bold, italic, strike-through, underlining), a font size, colors, and more. Classification lists and algorithms for classifying organizational relationships may also be trained and organizational relationships among procedure text may be classified with procedure text.

While all text may be classified, it is specifically contemplated that there may be some unclassified data (which includes both data that was not classified and data that was misclassified). So, it is specifically contemplated that in some embodiments a procedure classified data list may be post-processed to identify unclassified data. In one embodiment, unclassified data may be flagged for review, for example, by an administrator.

In one or more embodiments, text-to-data conversion system 104 may be used to create generic classified data lists 125 that may be used with any work procedure, and trained classified data lists 126 that are procedure-specific (i.e., specific to a work procedure). Further, trained classified data lists 126 may be used to analyze work procedures. For example, trained classified data lists 126 may be used to analyze information extracted from a work procedure to determine procedure pattern consistency or to extract information that is related to industry or trade craft specific conventions, and to use such extract information, for example, to evaluate maintenance, scheduling, time tracking, prediction, and more.

In one or more embodiments, an output of data mining 115 is a procedure-specific classified data list, and the procedure-specific classified data list may be migrated to a procedure data structure. A procedure-specific classified data list is a classified data list that has been fully tuned to text of a specific work procedure.

A conversion process may be configured to analyze procedure content using a procedure-specific classified data list, and identify procedure-specific information, procedure-specific tasks, supplemental information, and more. This may involve identifying both explicit and implicit actions. For implicit actions, a conversion process may identify implicit actions of a task and map such implicit actions to attributes (e.g., an XML attribute) of a procedure data structure responsive to, for example, task text and expert knowledge of procedure usage and adherence, i.e., adherence to organizational conventions and human performance tools.

In one or more embodiments, a processor may be configured to identify text and then process the text responsive to one or more conventions. Such conventions may be defined in configuration files selected responsive to an industry-type of a written procedure that is being converted. An industry-type may be provided or may be identified responsive to a procedure title, procedure number conventions, or other information. In one embodiment, a convention configuration file may be or include a learned model that has been trained using supervised and/or unsupervised learning techniques and written procedures of known industry-type.

Figure 3B:
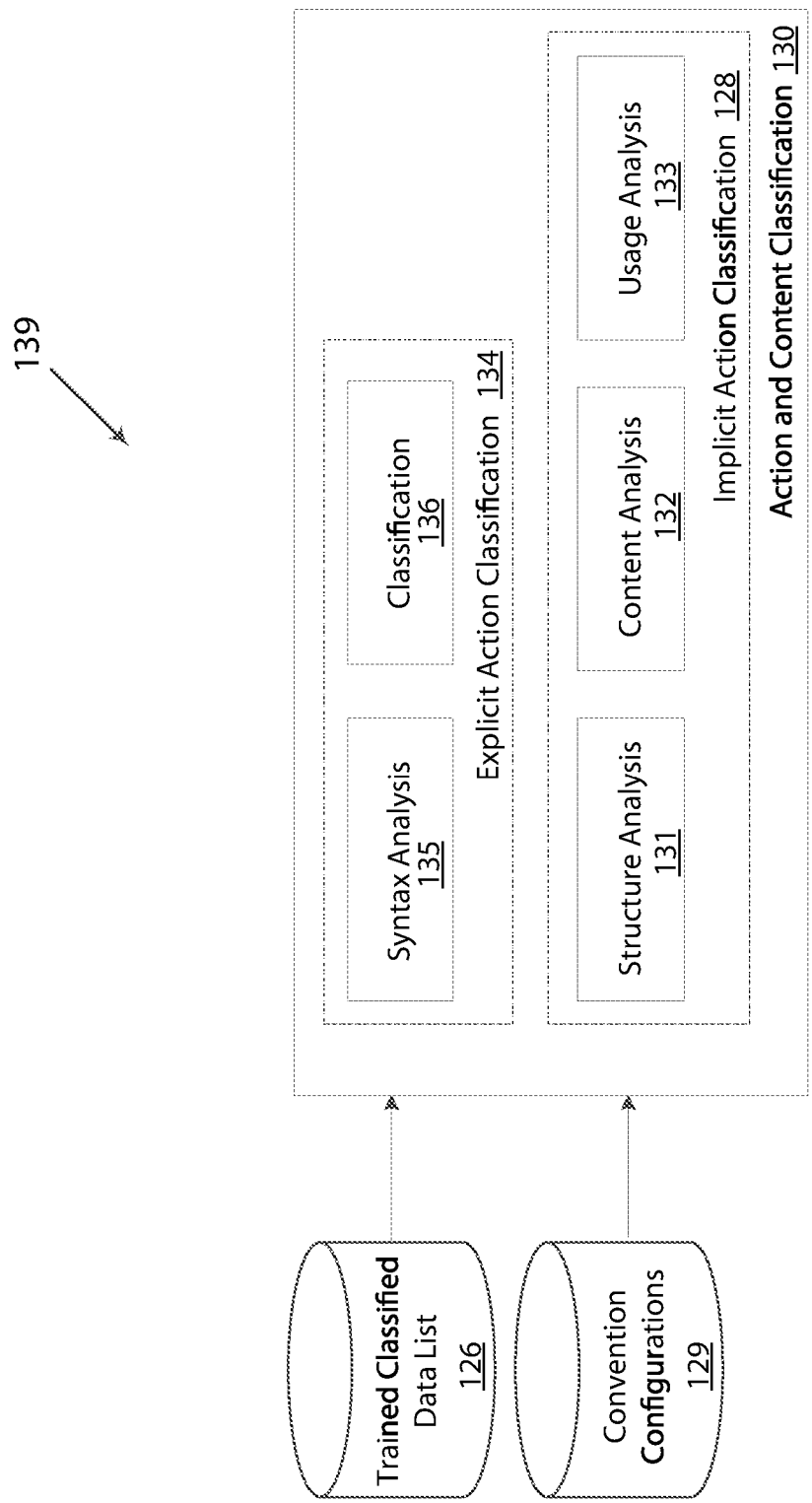
FIG. 3B shows functional block diagram of a processor 139 configured to identify explicit and implicit actions of a written procedure, in accordance with one or more embodiments of the disclosure.

FIG. 3B shows a processor 139 configured, generally, to identify explicit and implicit actions of a written work procedure, in accordance with one or more embodiments of the disclosure. Generally, the processor 139 may be configured to receive trained classified data lists 126 and convention configurations 129, and provide a list or indication of actions and content 130 associated with the actions (typically text). In one or more embodiments, the processor 139 may include explicit action classification 134 and implicit action classification 128. Explicit action classification 134 may be configured to identify actions from words and groups of words based on the syntax of text, and may include syntax analysis 135 and classification 136. Syntax analysis 135 may be configured to identify verbs through syntax that conveys an action, an occurrence, or a state of being, and classify the text as an action. Implicit action classification 128 may be configured to identify implicit actions from words and groups of words based on conventions, and may include structure analysis 131, content analysis 132, and usage analysis 133. In one embodiment, implicit action classification 128 may analyze words and groups of words responsive to convention configurations 129.

Figure 3C:
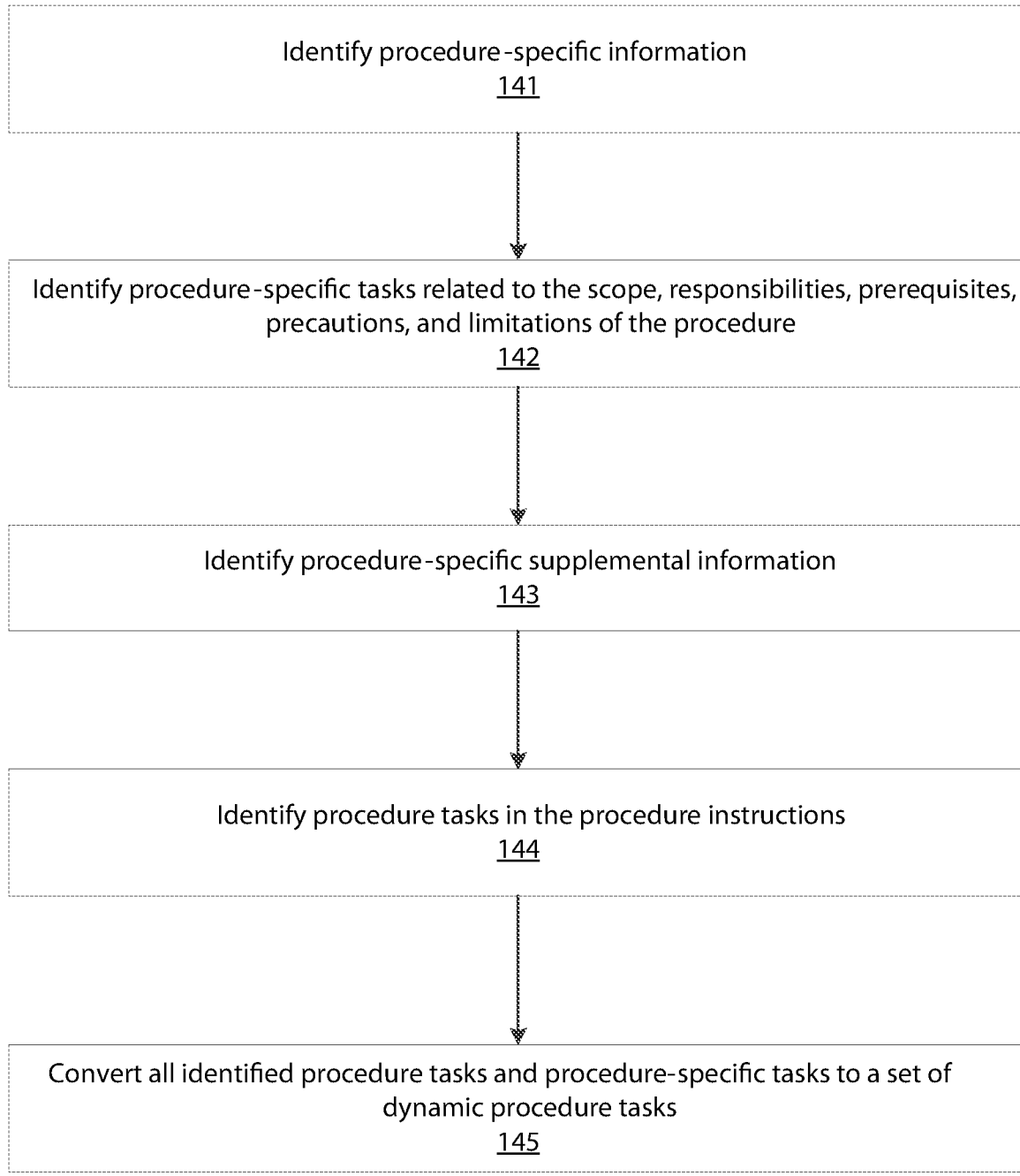
FIG. 3C shows a flowchart of a method to build a set of dynamic procedure tasks, in accordance with an embodiment of the disclosure.

FIG. 3C shows a method to build a set of dynamic procedure tasks, in accordance with embodiments of the disclosure. In operation 141, procedure specific information is identified, including without limitation a procedure title, revision number, procedure number, and author. In operation 142, procedure-specific actions related to scope, responsibilities, prerequisites, precautions, and limitations of a work procedure are identified. Procedure-specific actions are actions that relate to, or affect, a procedure as a whole. Examples of procedure specific actions include, without limitation, certain sign-offs, acknowledgments, validation of system configuration, etc. In operation 143, procedure specific supplemental information is identified. Examples of procedure specific supplemental information may include drawings, photos, references to related procedures, etc. In operation 144, instruction tasks are identified in the procedure instructions. In operation 145, each identified task is converted to dynamic procedure tasks. The dynamic procedure tasks comprise a set of dynamic procedure tasks.

One or more embodiments of the disclosure relate, generally, to a conversion process for mapping tasks of a work procedure to attributes of a procedure data structure. Tasks may include both explicit actions and/or implicit actions of a work procedure to attributes of a procedure data structure. Explicit actions are generally recited in, and identifiable from, procedure text. Implicit actions are, generally, implied in procedure text, but not recited in the procedure text, and may be identifiable from procedure text and conventions used by experts in an industry.

Figure 4:
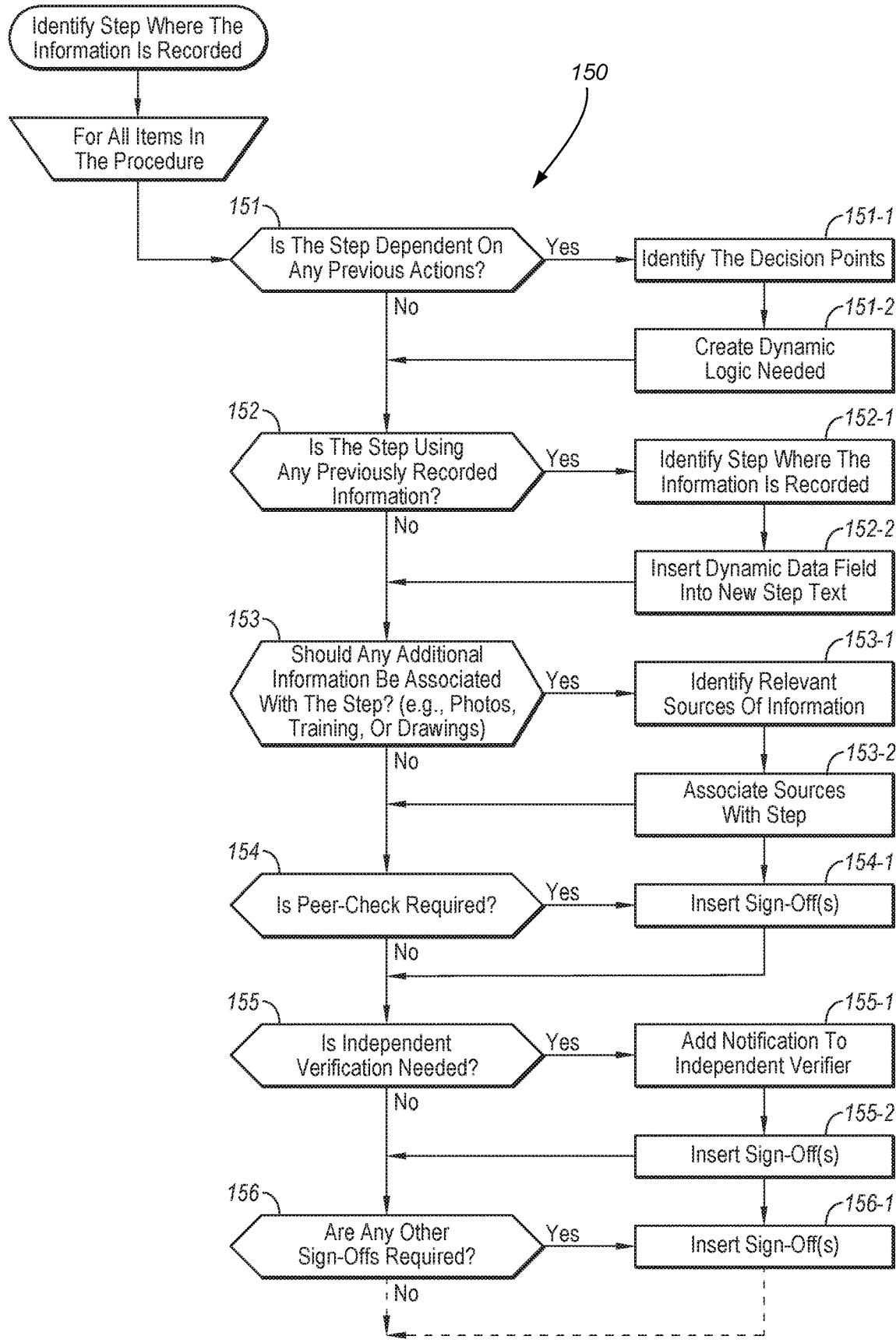
FIG. 4 shows a flowchart of a process for identifying procedure specific actions related to a task, in accordance with an embodiment of the disclosure.

FIG. 4 shows a flowchart of a process 150 for identifying procedure-specific tasks from procedure text, in accordance with embodiments of the disclosure. In operation 151, it is determined if a task is dependent on any previous actions. If "yes," in operation 151-1, location(s) where information is recorded is identified, and in operation 151-2, dynamic logic is created responsive to identifying where the information is recorded. In operation 152, It is determined if a task uses any previously recorded information. If "yes," in operation 152-1, each task where such information is recorded is identified, and, in operation 152-2, a dynamic data field that is updated by the previously recorded information is inserted text of the current task. In operation 153, it is determined if any additional information should be associated with the task. If "yes," then in operation 153-1, relevant sources of information are identified, and, in operation 153-2, the identified relevant sources of information are associated with the task. In operation 154, it is determined if a peer-check is required in operation 154. If "yes," then a sign-off is created in operation 154-1. It is determined if an independent verification is needed in operation 155. If "yes," then a notification is created for the independent verifier in operation 155-1, and a sign-off is created in operation 155-2. It is determined if any other sign-offs are required in operation 156. If "yes," then a sign-off is created for each such identified sign-off in operation 156-1.

In one or more embodiments, an output/result of process 150 is a list of procedure-specific tasks. Once procedure-specific tasks have been identified and/or created, each task type is identified as well as related sub-processes to convert each identified task type to a dynamic procedure task. In one embodiment, task types for each task are identified using results from process 150 and/or procedure text.

Figure 5:
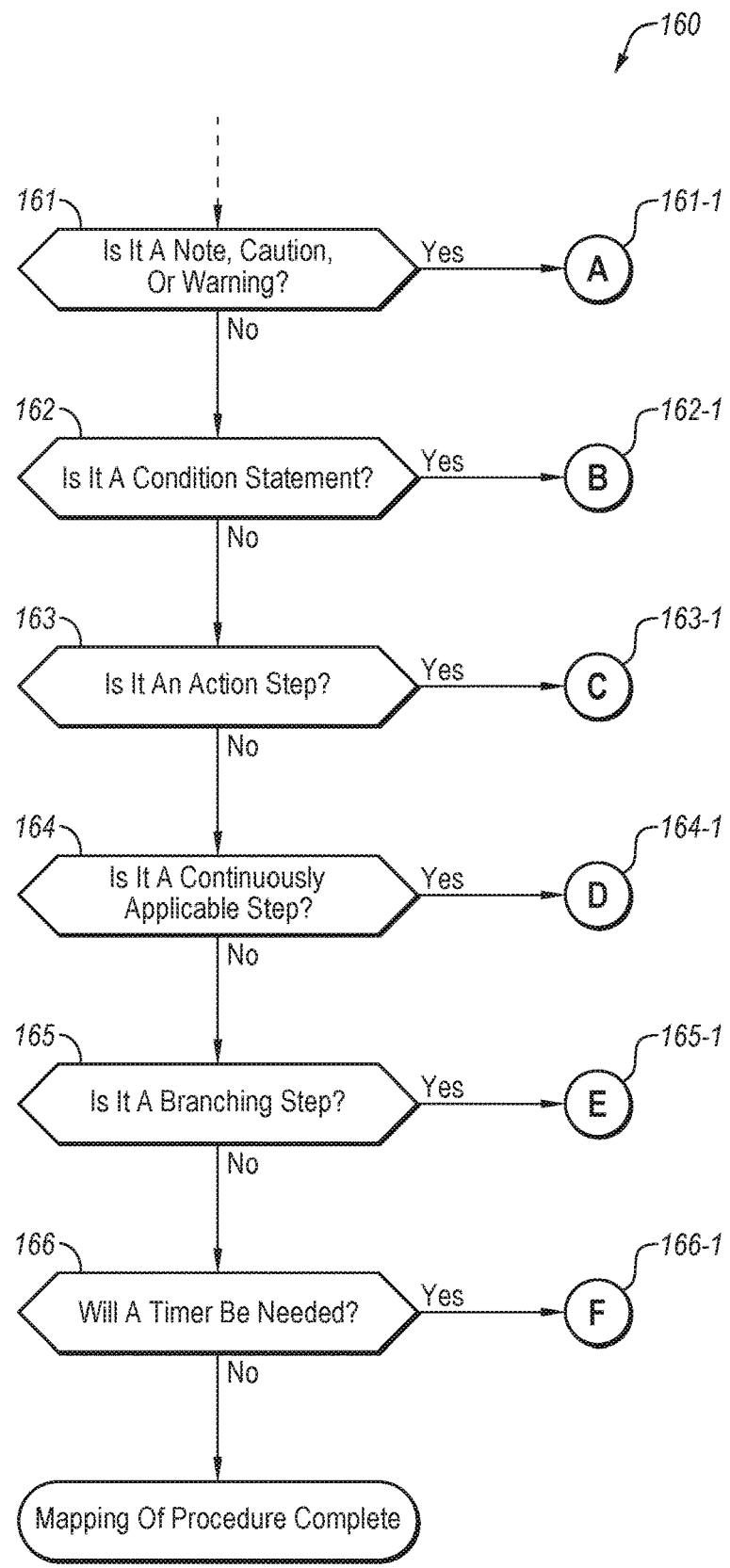
FIG. 5 shows a flowchart of a process of determining which sub-processes to use to convert a task to a structured data, in accordance with an embodiment of the disclosure.

FIG. 5 shows a process 160 for determining sub-processes to use to map a task to a procedure data structure, in accordance with embodiments of the disclosure. In operation 161, it is determined if the task is a note, caution or warning, and if "yes," then in operation 161-1 a warning conversion sub-process is identified. In operation 162, it is determined if the task is a conditional statement, if "yes," then in operation 162-1 a conditional statement conversion sub-process is identified. In operation 163, it is determined if a task is an action task, if "yes," then in operation 163-1 an action task conversion sub-process is identified. In operation 164, it is determined if a task is a continuously applicable task, if "yes," then in operation 164-1 a continuously-applicable task conversion sub-process is identified. In operation 165, it is determined if a task is a branching task, if "yes," then in operation 165-1 a branching conversion sub-process is identified. In operation 166, it is determined if a timer is needed in a task, if "yes," then a timer conversion sub-process is identified. The identified sub-processes comprise the conversion process for the task.

Figure 6:
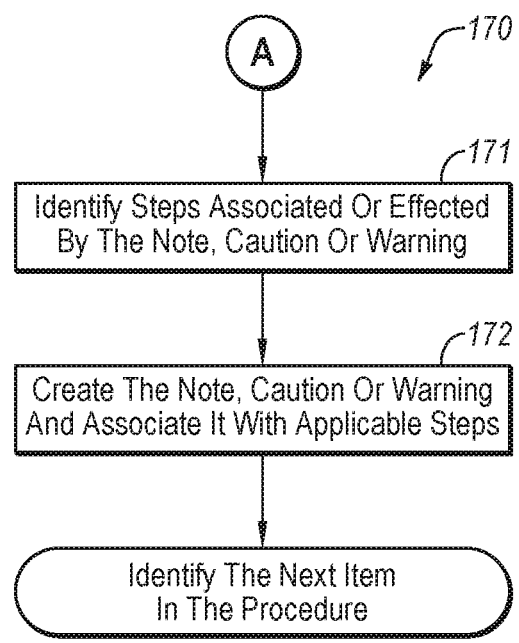
FIG. 6 shows a flowchart of a warning conversion sub-process, in accordance with an embodiment of the disclosure.

FIG. 6 shows a warning conversion sub-process 170, in accordance with an embodiment of the disclosure. Other tasks associated with or effected by the note, caution or warning are identified in operation 171. The note, caution or warning is created and associated with the other identified tasks in operation 172. Process 170 moves to a next item (task) in a procedure.

Figure 7:
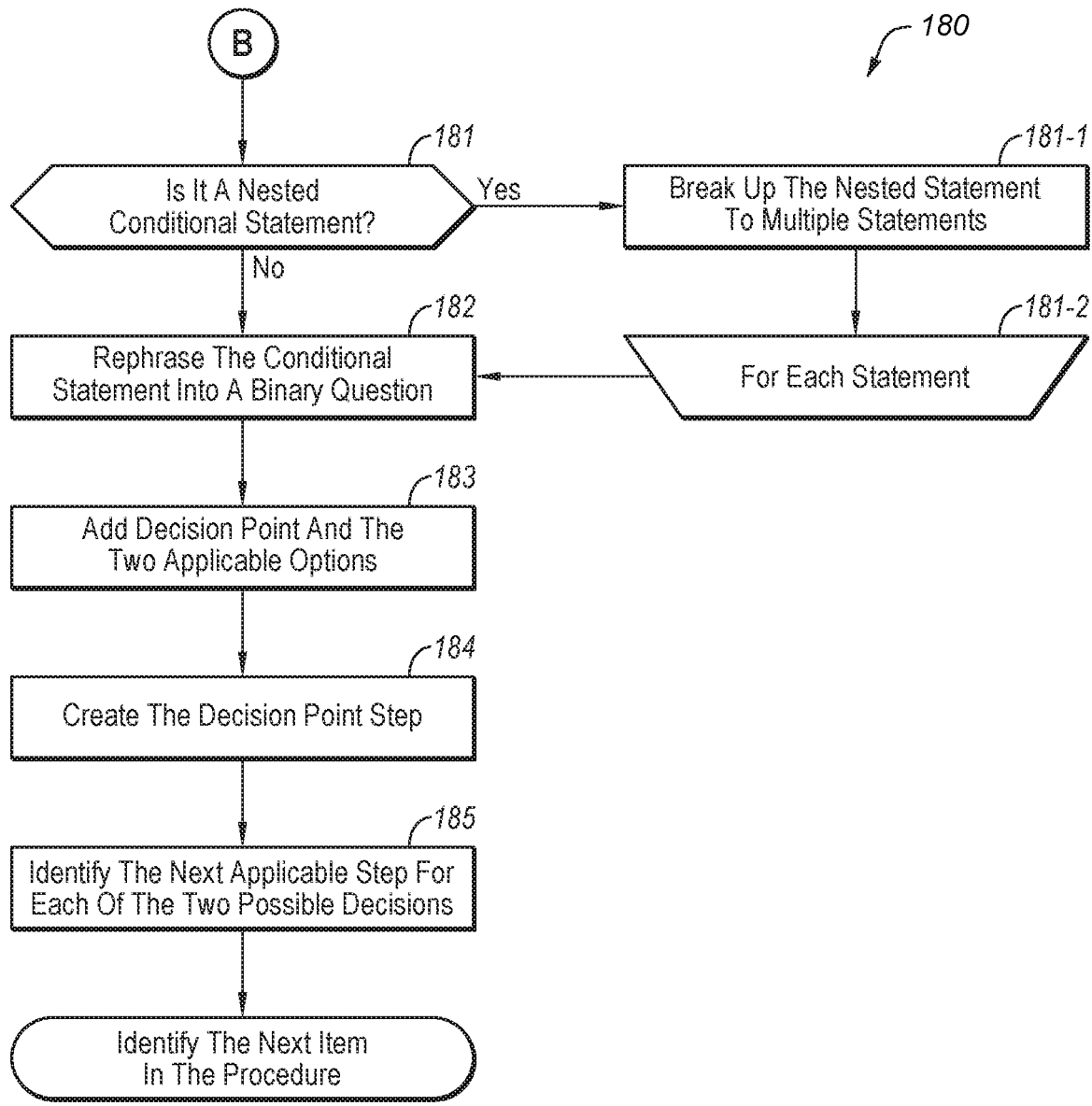
FIG. 7 shows a flowchart of a conditional statement conversion sub-process, in accordance with an embodiment of the disclosure.

FIG. 7 shows a conditional statement conversion sub-process 180, in accordance with an embodiment of the disclosure. In operation 181, it is determined if a task is a nested conditional task. If "yes," then in operation 181-1, multiple tasks are created (operation 181-2) from the nested conditional task that, logically, are equivalent to the nested conditional task. In operation 182, a binary task (i.e., a question for which the answer is either yes or no) is created for the current ask or each of the multiple tasks (e.g., from operation 181-1), as the case may be. In operation 183, for each binary task (e.g., from operation 182) a decision point and at least two options based on the decision point are created. In operation 184, for each binary task a decision point task is created based on the created decision point and two options. In one embodiment, the decision point tasks replace or are created from the binary tasks. In operation 185, a next applicable task is identified for each of the two options.

Figure 8:
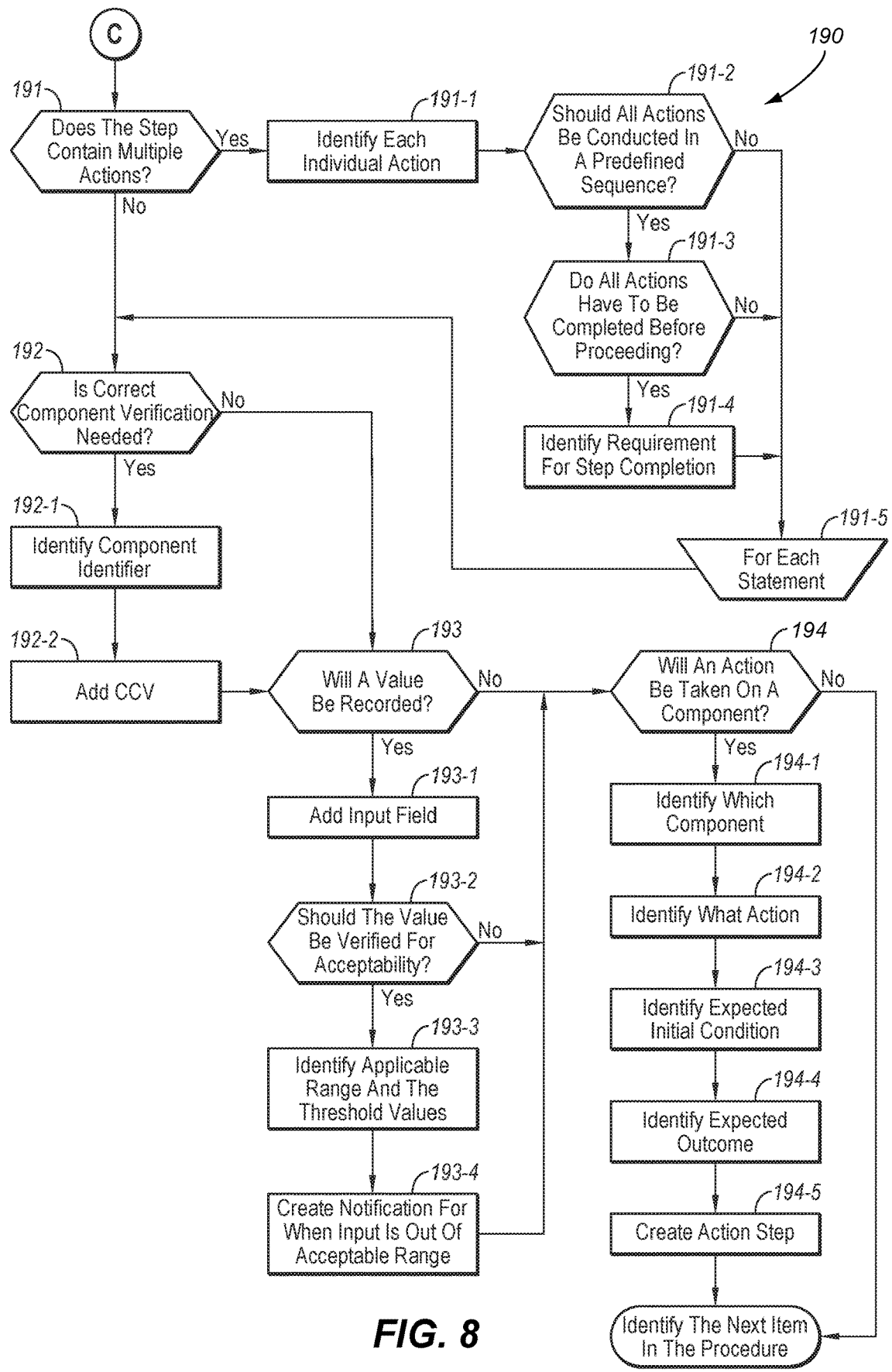
FIG. 8 shows a flowchart of an action conversion sub-process, in accordance with an embodiment of the disclosure.

FIG. 8 shows an action conversion sub-process 190, in accordance with an embodiment of the disclosure. It is determined if the task contains multiple actions in operation 191. If "yes," then each individual action is identified in operation 191-1. For each individual identified action, it is determined if all actions should be conducted in a predefined sequence in operation 191-2. If "yes," then it is determined if all actions have to be completed before proceeding in operation 191-3. If "yes," then the requirements to complete the step are identified in operation 191-4. If "no," then the requirements to complete the step are identified in operation 191-5. For the action of the current task or, in the case of multiple actions, each individually identified action, it is determined if the correct component verification is needed in operation 192. If "yes," then the component identifier is identified in operation 192-1, and a correct component verification (CCV) is created in operation 192-2. If no CCV is needed or following creation of the CCV then it is determined if a value will be recorded in operation 193. If "yes," then an input field is added in operation 193-1. It is determined if the value should be verified for acceptability in operation 193-2. If "yes," then the applicable range and threshold values are identified in operation 193-3, and a notification is created for when an input is out of acceptable range in operation 193-4. If no value is recorded or following creation of the notification, it is determined if an action will be taken on a component in operation 194. If "yes," then the component is identified in operation 194-1, the action is identified in operation 194-2, the expected initial condition is identified in operation 194-3, and the expected outcome is identified in operation 194-4. An action is created in operation 194-5. In the case where the task includes multiple actions, multiple actions will be created by the conversion sub-processor 31.

Figure 9:
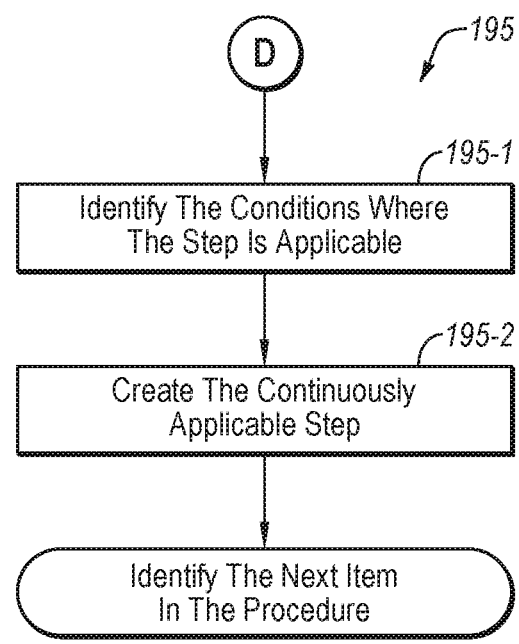
FIG. 9 shows a flowchart of a continuously-applicable step conversion sub-process, in accordance with an embodiment of the disclosure.

FIG. 9 shows a continuously-applicable step conversion sub-process 195, in accordance with an embodiment of the disclosure. In operation 195-1, conditions where the task is applicable are identified. In operation 195-2, a continuously applicable task is created.

Figure 10:
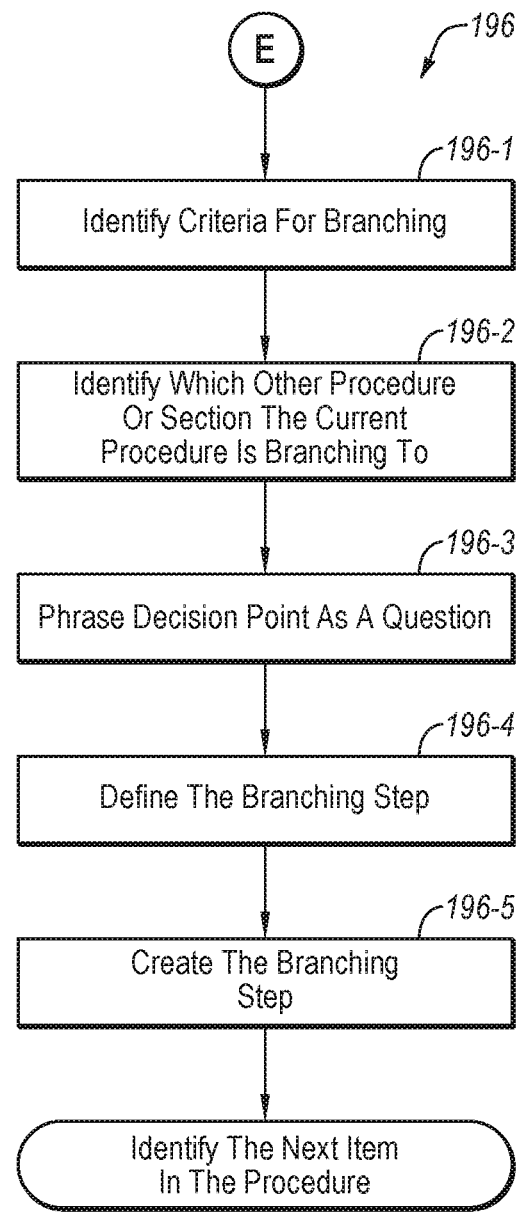
FIG. 10 shows a flowchart of a branching conversion sub-process, in accordance with an embodiment of the disclosure.

FIG. 10 shows a branching conversion sub-process 196, in accordance with an embodiment of the disclosure. A branching task, generally, is a task that directs a worker to another section either within the same procedure or in another procedure. Branching may be triggered by input from a user (e.g., similar to conditional steps) or based on previous actions taken during job execution such as a previous recorded value or a result from a calculation. In operation 196-1, criteria for branching are identified. In operation 196-2, other procedures or sections that a current procedure branches to are identified. In operation 196-3, a decision point associated with a branching is identified and rephrased as a binary question. In operation 196-4, branching points from the branching decision point are defined. In operation 196-5, a branching task is created in operation 196-5.

Figure 11:
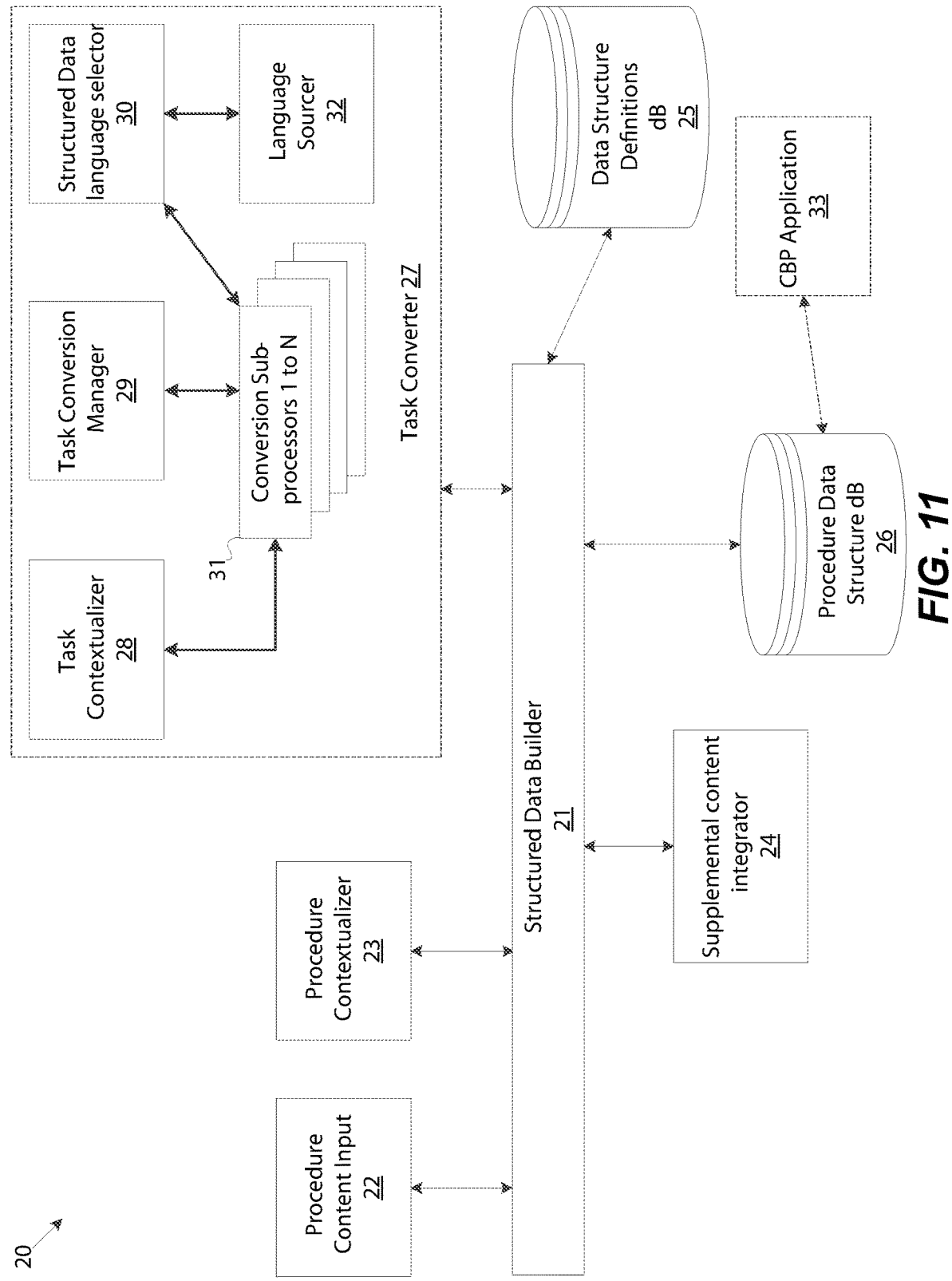
FIG. 11 shows a block-diagram of a conversion system, in accordance with an embodiment of the disclosure.

One or more embodiments of the disclosure relate, generally, to a system for converting a static procedure to a dynamic procedure. FIG. 11 shows an example conversion system 20, in accordance with one or more embodiments of the disclosure. Conversion system 20 includes a structured data builder 21, procedure content input 22, procedure contextualizer 23, supplemental content integrator 24, data structure definitions database 25, procedure data structure database 26, and task converter 27. In an embodiment, conversion system 20 is a software application executing on a workstation.

Structured data builder 21, in one embodiment, is configured to manage a conversion process, calling the other functions. Structured data builder 21 may be configured to receive parsed procedure sections, procedure-specific information, dynamic procedure tasks, and a data structure definition, and assemble a procedure data structure. In one embodiment, structured data builder 21 is configured to manage a conversion process for one type of procedure. In another embodiment, structured data builder 21 is configured to manage the conversion processes for several types of procedures, and configured to perform a conversion process responsive to a procedure identifier received from procedure content input 22.

In one embodiment, structured data builder 21 is configured to associate parsed procedure sections, procedure-specific information, and dynamic procedure tasks with fields of a data structure definition, and insert them into the associated fields of a procedure data structure. Structured data builder 21 may also be configured to create content (e.g., text and logic) for insertion to fields of a procedure data structure.

Procedure content input 22, in one embodiment, is configured to manage input of procedure content, for example, front matter, instructions, supplemental content, and external content referenced in a written procedure. Procedure content may be received as electronic documents scanned from written procedures, input by a user using an electronic form or guided by an application prompt, or received from other systems at a site or facility. In some embodiments, procedure content may be in the form of a previously created procedure data structure that includes one or more dynamic procedure tasks relevant to the current procedure being converted.

In one or more embodiments, procedure content input 22 may be configured to pre-process any procedure content, for example, text and section recognition, enhancing the quality of text and images, and adding tags to procedure content to assist with converting the procedure content. Procedure content input 22 may pre-process automatically and/or a user may provide tags to add to the procedure content via a user interface. By way of example, tags may be added to procedure content to identify procedure sections, instructions, references to other procedures, relationships between supplemental content and instructions, etc.

In one or more embodiments, procedure contextualizer 23 may be configured to manage processing procedure content to determine procedure specific information, such as a procedure title, revision numbers, procedure numbers, and authors. Procedure contextualizer 23 may also be configured to identify and determine procedure-specific tasks in procedure content related to scope, responsibilities, prerequisites, precautions, and limitations of procedure content. Examples of procedure specific tasks include, without limitation, certain sign-offs, acknowledgments, and validation of system configuration. Procedure contextualizer 23 may also be configured to identify specific supplemental information in procedure content. Examples of procedure specific supplemental information may include drawings, photos, references to related procedures, etc.

Supplemental content integrator 24, in one embodiment, may be configured to integrate supplemental content in the procedure content with the procedure data structure. Supplemental content integrator 24 may be configured to process any supplemental content before it is integrated with a procedure data structure.

Data structure definitions database 25, in one embodiment, may be configured to store procedure data structure definitions available to conversion system 20. Procedure data structure database 26, in one embodiment, may be configured to store procedure data structures for procedures, including those converted by the conversion system 20. Data structure definitions database 25 and procedure data structure database 26 may be at a local data storage or remote data storage (e.g., a networked attached storage), and may be available via a local file system, distributed file system, or clustered file system.

Task converter 27, in one embodiment, may be configured to convert static procedures defined by instructions in procedure content to dynamic procedure tasks. Task converter 27 may include task contextualizer 28, task conversion manager 29, structured data language selector 30, conversion sub-processors 31, and language parts sourcer 32. Task contextualizer 28, in one embodiment, is configured to identify task-specific information as well as procedure-specific actions related to a task. Task-specific information may include, for example, a name of a task. Identifying procedure specific tasks may include identifying dependencies on previous tasks, dependencies on previously recorded information, dependencies on prior sign-offs, dependencies on final sign-offs, dependencies on information at external sources, dependencies on verifications (e.g., component verifications), location of required recorded information, etc. Task and procedure-specific actions may be provided to task conversion manager 29.

Task conversion manager 29, in one embodiment, may be configured to convert tasks to dynamic procedure tasks. Task conversion manager 29 may be configured to select conversion sub-processors 31 to apply to a task to determine and create details and create a dynamic procedure task with the determined details. Such dynamic procedure tasks are made available to structured data builder 21, and then structured data builder 21 may insert the dynamic procedure tasks into a procedure data structure.

Conversion sub-processors 31 may be configured to call structured data language selector 30 based on processing results. Structured data language selector 30, in one embodiment, may be configured to provide strings of text or code that may be inserted into a procedure data structure. For example, if a notification conversion sub-processor 31 determines that a notification action is associated with a task then structured data language selector 30 may provide some or part of a notification in an XML format. In one embodiment, structured data language selector 30 may be configured to identify a type of XML code string and wrap information provided by a conversion sub-processor 31 in an appropriate code format. Structured data language selector 30 may have access to language parts sourcer 32, which, in one embodiment, may be a database. In another embodiment, language parts sourcer 32 may be a user application by which a user may write or edit XML code (or other code) and such code is accessible to structured data language selector 30.

FIGS. 12A-12D show an example of application of a conversion process applied to procedure instructions for adjusting a heater, in accordance with one or more embodiments of the disclosure. The instruction steps are:

1.3 Record the outside temperature.
1.4 If outside temperature is ≤45° F., perform the following:

1.4.1 Ensure HEATER 123 toggle switch is in the "ON" position 1.4.2 Wait at least 60 seconds 1.5 IF outside temperature is >45° F., ensure the HEATER 123 toggle switch is in the "OFF" position.

The first step in the instruction (step 1.3) follows the format of a specific action that to be carried out on a component, hence it is an action step. The step instructs a user to record an outside temperature. Hence, the step is a single action step where a value will be recorded and saved. The outside temperature does not require any check for acceptability other than ensuring the input is a numeric value within a reasonable temperature range.

Figure 12A:
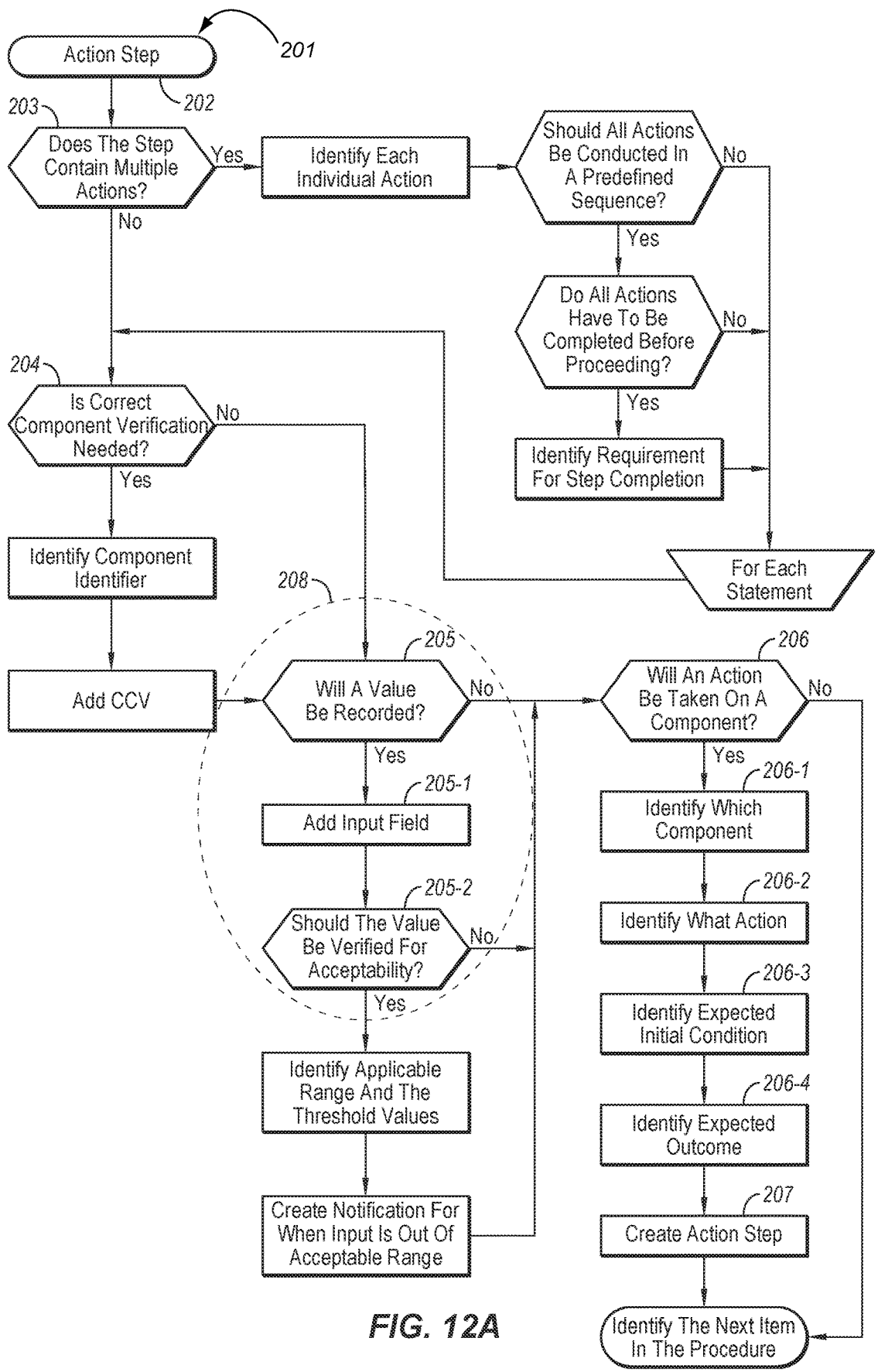
FIGS. 12A to 12D show flowcharts of a conversion process applied to a heater check procedure, in accordance with an embodiment of the disclosure

FIG. 12A shows the process applied by the conversion system 20 to convert step 1.3. The task contextualizer 28 identifies instruction 1.3 as an action step in operation 201. The task conversion manager 29 calls the conversion sub-processors 31 that execute the warning conversion sub-process 170, in operation 202. The conversion sub-processor 31 determines that step 1.3 does not contain multiple actions in operation 203. The conversion sub-processor 31 then determines that a "correct component verification" is not needed in operation 204. The conversion sub-processors 31 determines that a value will be recorded in operation 205, and adds an input field to the dynamic procedure task in operation 205-1 and determines that the value does not need to be verified for acceptability in operation 205-2. The conversion sub-processors 31 determines that an action will be taken on a component in operation 206. The conversion sub-processors 31 identifies the component in operation 206-1 (temperature gauge), identifies the action to be taken in operation 206-2 (read the temperature), identifies expected initial conditions in operation 206-3 (expected temperature range), identifies an expected outcome in operation 206-4 (a number), and creates an action step in operation 207.

The outside temperature is a recorded in a step previous to where it is being used as a decision point in operation 1.4. A user needs to link the value recorded in step 1.3 to a dynamic field in step 1.4 which enables the value to automatically populate in step 1.4 as it is recorded.

Notably, in the embodiment shown in FIG. 12A, operation 204, operation 206, and operations 208 extract implicit actions from the text. Here, a check for correct component verification is understood based on conventions associated with the industry with which the written procedure is associated. Ranges and threshold values defined in the prerequisites (e.g., 100-150 degrees Fahrenheit), and so a measurement may be checked automatically and a notification generated if the temperature is outside the acceptable range.

Figure 12B:
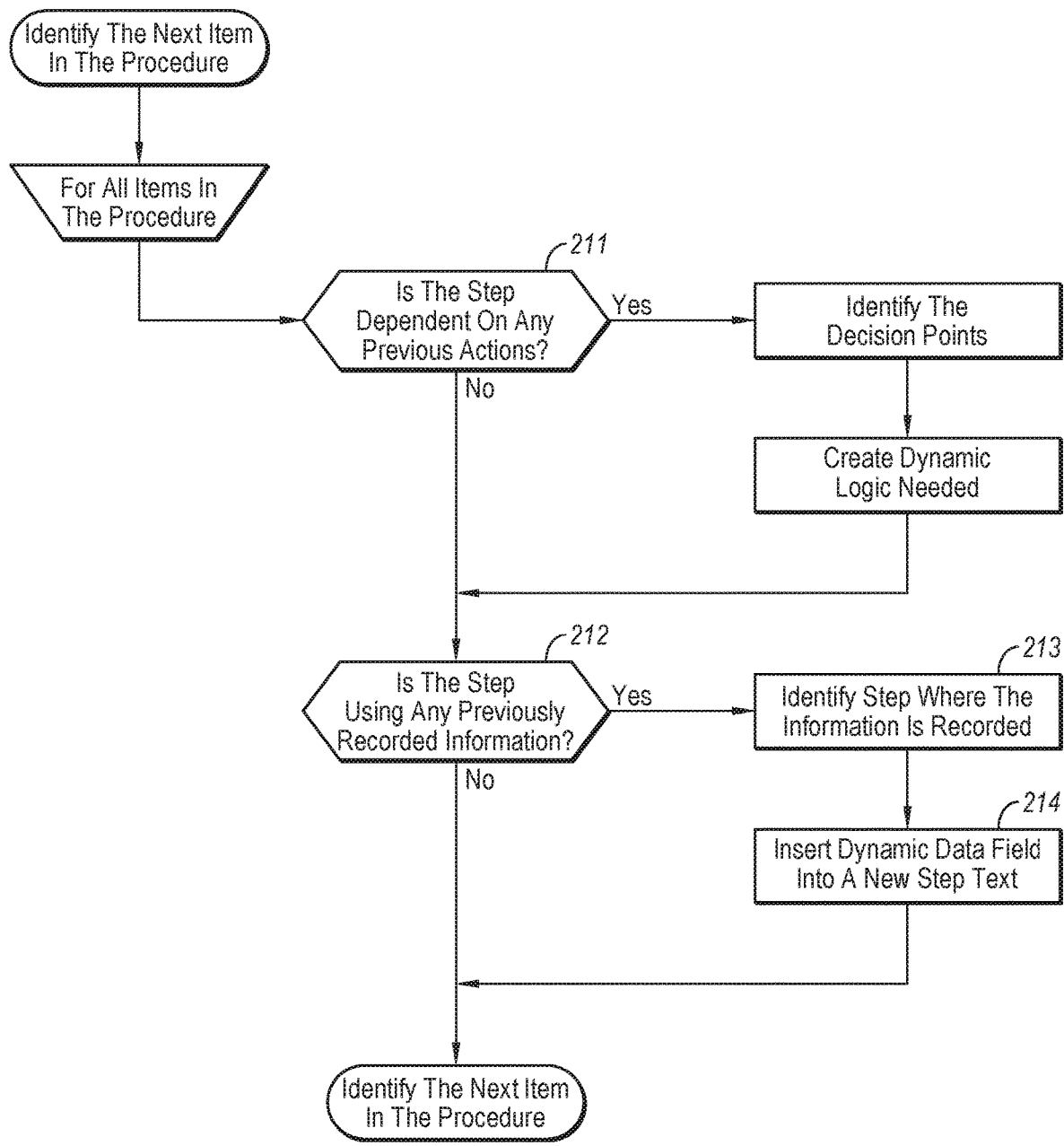

FIG. 12B shows the application of the process applied by the conversion system 20 to identify and use previously recorded information. The task contextualizer 28 identifies step 1.4 as dependent on previously recorded information in operation 211. The task contextualizer 28 identifies the information is previously recorded in operation 212, and identifies the step (step 1.3) where the information is recorded in operation 213. The task contextualizer 28 inserts a dynamic data field into the dynamic procedure task in operation 214. The dynamic data field is configured to be automatically updated by the value in the location where the outside temperature is recorded.

Figure 12C:
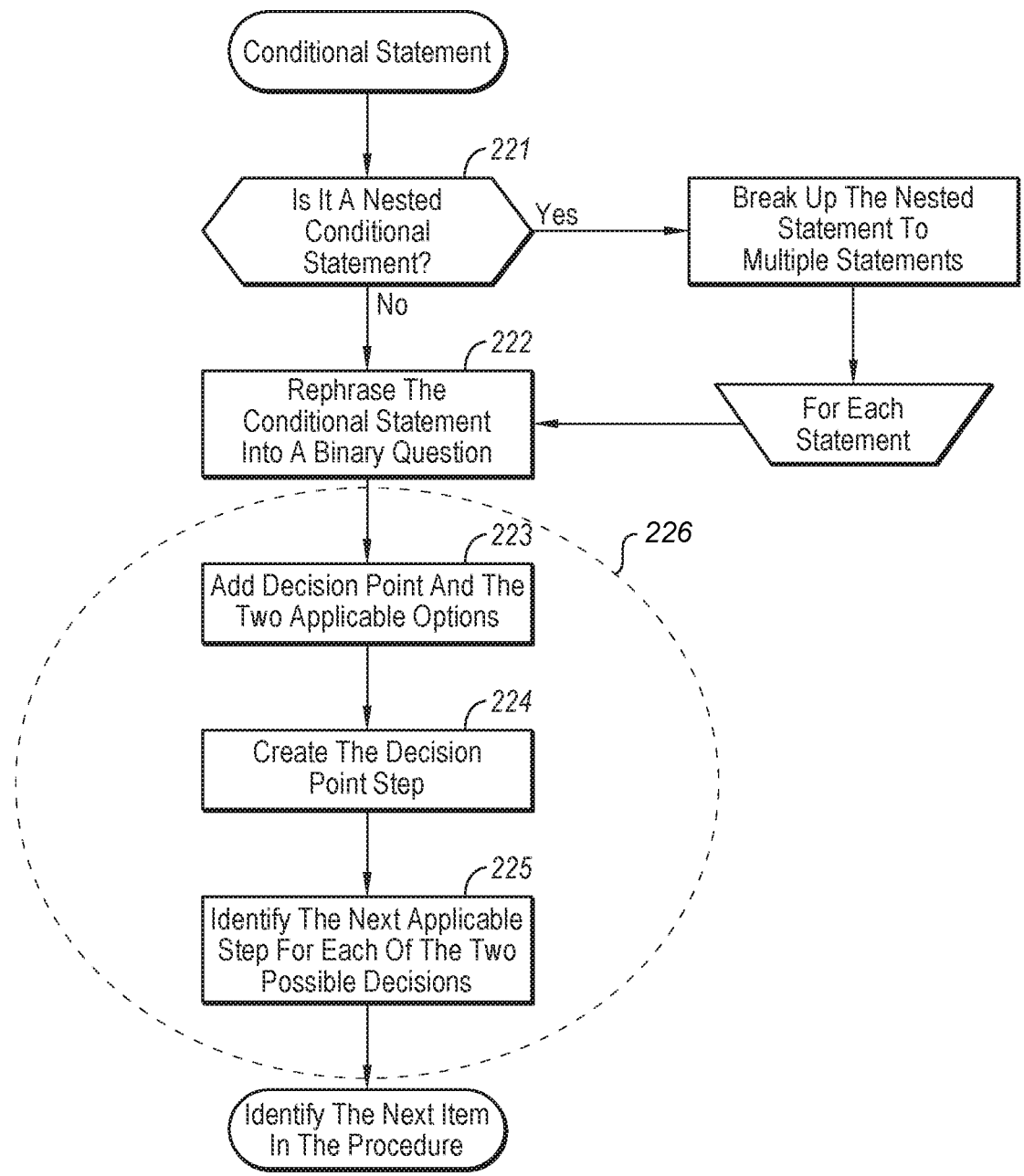

FIG. 12C shows the application of the process applied by the conversion system 20 to convert the conditional statement in step 1.4 into a dynamic procedure task. The task contextualizer 28 identifies step 1.4 as a conditional statement in operation 221. In one embodiment, the task contextualizer 28 identifies the conditional statement by identifying the pattern of "IF a condition THEN" take action. The task conversion manager 29 calls the conversion sub-processors 31 to convert a conditional statement in operation 222. The conversion sub-processor determines that the conditional statement in step 1.4 is not a nested conditional statement in operation 223. The structured data language selector 30 provides a rephrased version of the conditional statement as a binary statement in operation 224. For example, the statement, "If outside temperature is ≤45° F." is rephrased to a binary question, "Is the outside temperature≤45 degrees Fahrenheit?" The conversion sub-processor 31 creates a decision point with and two applicable options in operation 224. The decision point with the rephrased statement is inserted into the dynamic procedure task in operation 224. The next applicable task for each of the two possible decisions (yes/no) are identified and inserted into the dynamic procedure task in operation 225.

Notably, the operations 226 address the conditional statements in 1.4 and 1.5.

The conditional statement can be automated even further. Since the outside temperature has been recorded in a previous step the answer to the question in step 1.4 is already known. Hence, if the outside temperature is 50° F. then step 1.4 is not applicable and will not be displayed to the user. However, if the temperature is 40° F. then step 1.4 and its sub-steps will be displayed. FIG. 12C shows the process for rephrasing the conditional statement.

When the conditional statement in step 1.4 is addressed the task conversion manager 29 loads step 1.4.1. The step only contains the action to toggle one switch, which means it is a single action step. The expected initial condition is for the switch to be in either the "ON" or "OFF" position. The expected outcome is for the switch to be in the "ON" position. A verification will be needed to confirm that a user is in fact about to take action on HEATER 123. The component identifier to be used for the correct component verification (CCV) is HEATER 123. This identifier will be compared to the scanned value from barcode, RFID tag, or other means to conduct a digital CCV. If the identifier matches the scanned CCV value then the user is at the right component and will be allowed to proceed. If the identifier is not a match with the scanned value the user should be notified and asked to locate the correct component.

Figure 12D:
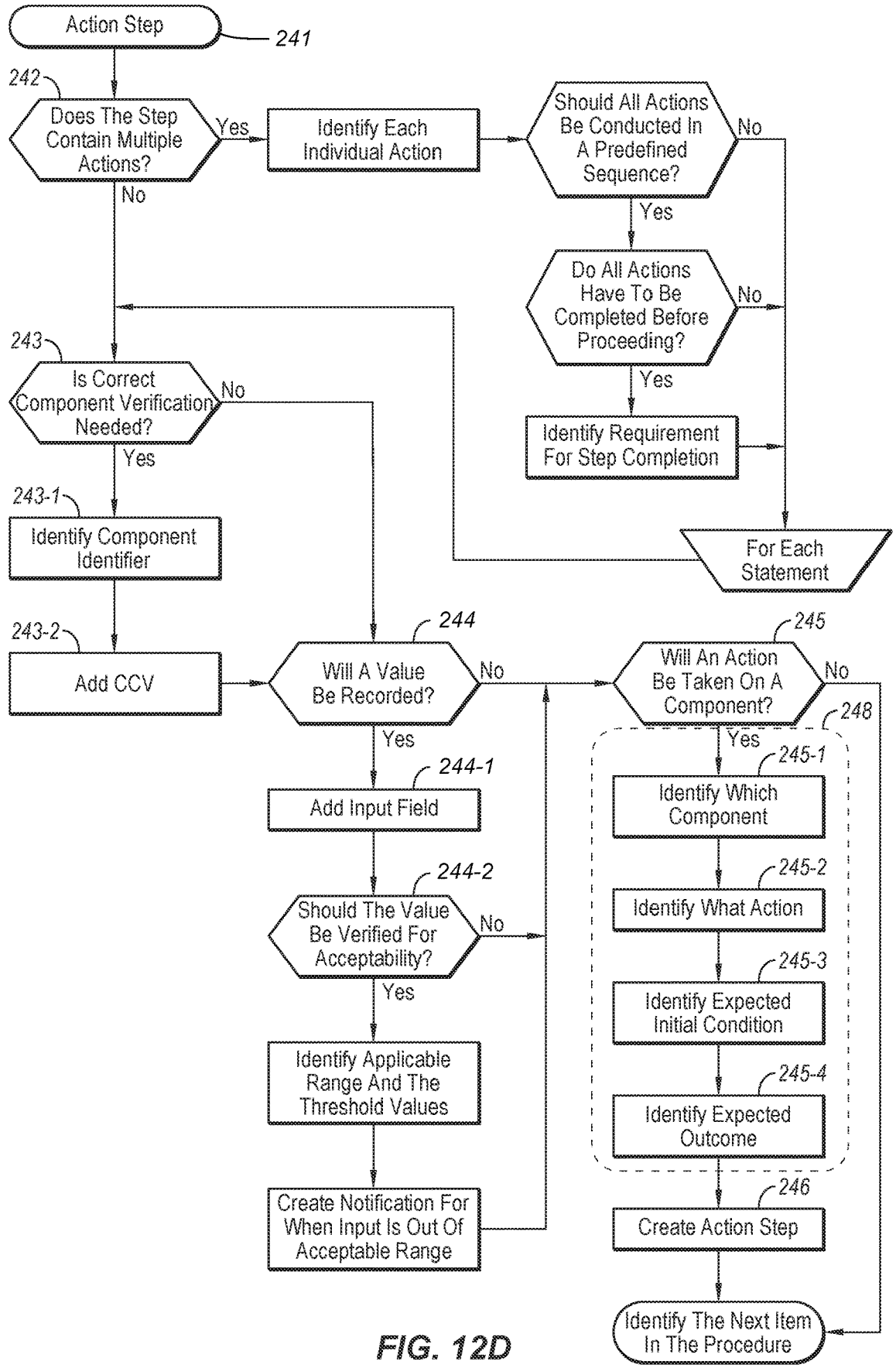

FIG. 12D shows the conversion of step 1.4.1. The task conversion manager 29 determines that step 1.4.1 is an action step and calls the conversion sub-processors 31 to convert an action step in operation 241. The conversion sub-processor 31 determines that step 1.4.1 does not contain multiple actions in operation 242. The conversion sub-processor 31 determines that a "correct component verification" is needed in operation 243. The conversion sub-processors 31 identifies the component identifier (e.g., HEATER 123) in operation 243-1 and receives a CCV string from the structured data language selector 30 that is added to the dynamic procedure task in operation 243-2. The conversion sub-processor 31 determines that a value will not be recorded in operation 244, and adds an input field to the dynamic procedure task in operation 244-1 and determines that the value does not need to be verified for acceptability in operation 244-2. The conversion sub-processors 31 determine that an action will be taken on a component in operation 245. The conversion sub-processors 31 identifies the component in operation 245-1 (e.g., HEATER 123), identifies the action to be taken in operation 245-2 (e.g., determine HEATER 123 is switched "ON"), identifies the expected initial condition in operation 245-3 (e.g., "ON" or "OFF"), and identify an expected outcome in operation 245-4 (e.g., HEATER 123 switch is "ON"). The conversion sub-processor 31 creates the dynamic procedure task corresponding to the action for step 1.4.1 in operation 246.

In step 1.4.2 the user is requested to wait a specific time before proceeding. To ensure the user waits the prescribed time, a timer may be added to the dynamic procedure task. The timer is started when the step is initiated and the user will not be able to proceed to the next step until the specified time has elapsed.

Notably, operations 248 are based on implicit information, here, confirming the expected initiation conditions of the heater toggle switch.

The same process may be followed for conversion of step 1.5.

Figure 13:
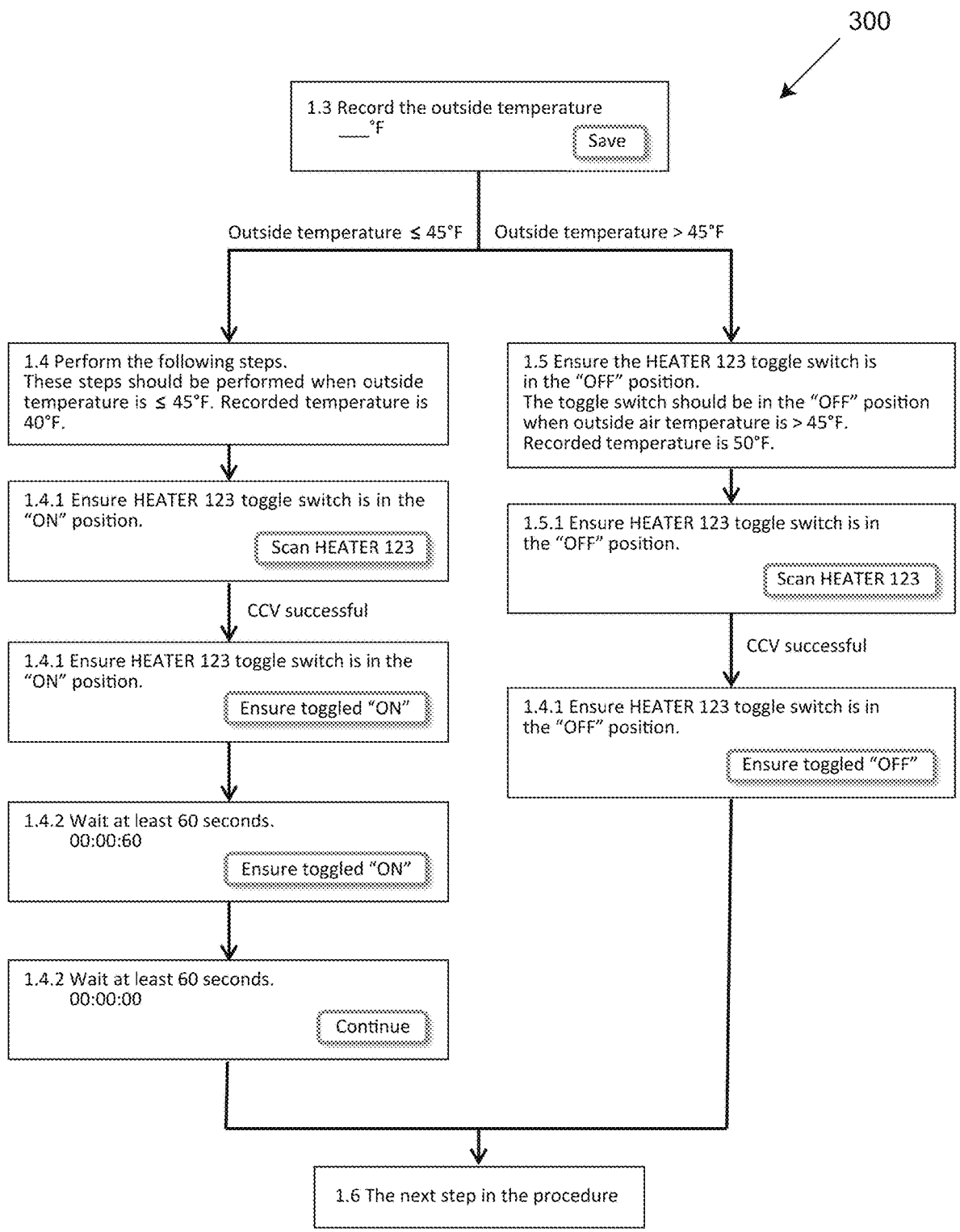
FIG. 13 shows a graphical representation of the logic of the dynamic procedure tasks created from the conversion process applied to the heater check procedure, in accordance with an embodiment of the disclosure.

FIG. 13 is a flowchart of dynamic procedure logic 300 that comprises the example dynamic procedure tasks created from the example conversion process shown in FIGS. 12A through 12D.

FIGS. 14A to 14O show an example creation of a procedure data structure (here, an XML, document) using the processes shown in FIGS. 12A-12D and 13.

FIG. 14A shows a step number inserted into procedure data structure 1400.

FIG. 14B shows step text inserted into a step variable of procedure data structure 1400.

Figure 14C:
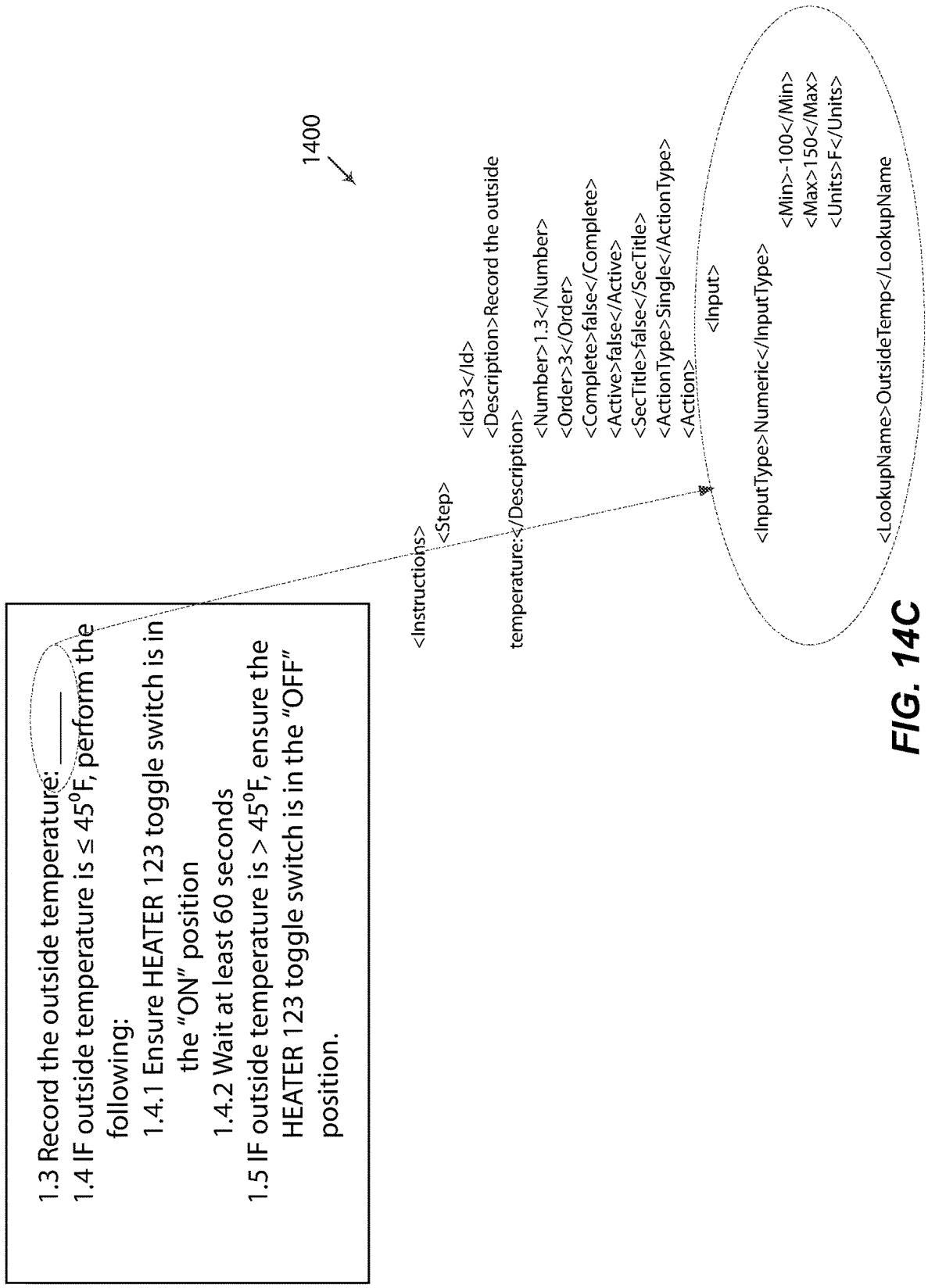
FIGS. 14A to 14Q show the construction of a procedure data structure, in accordance with an embodiment of the disclosure.

FIG. 14C shows an operator input inserted into procedure data structure 1400 and defines a variable under which an input value will be stored so it can be used later (along with associated information, such as min and max values for comparison, which are defined in the prerequisites of the procedure but not shown here).

Figure 14D:

FIG. 14D shows conditional logic based on a previous input being inserted into procedure data structure 1400. Here, the outcomes are based on whether the temp is greater than or less than 45 degrees, and will either go to step 1.4 or step 1.5.

Figure 14E:
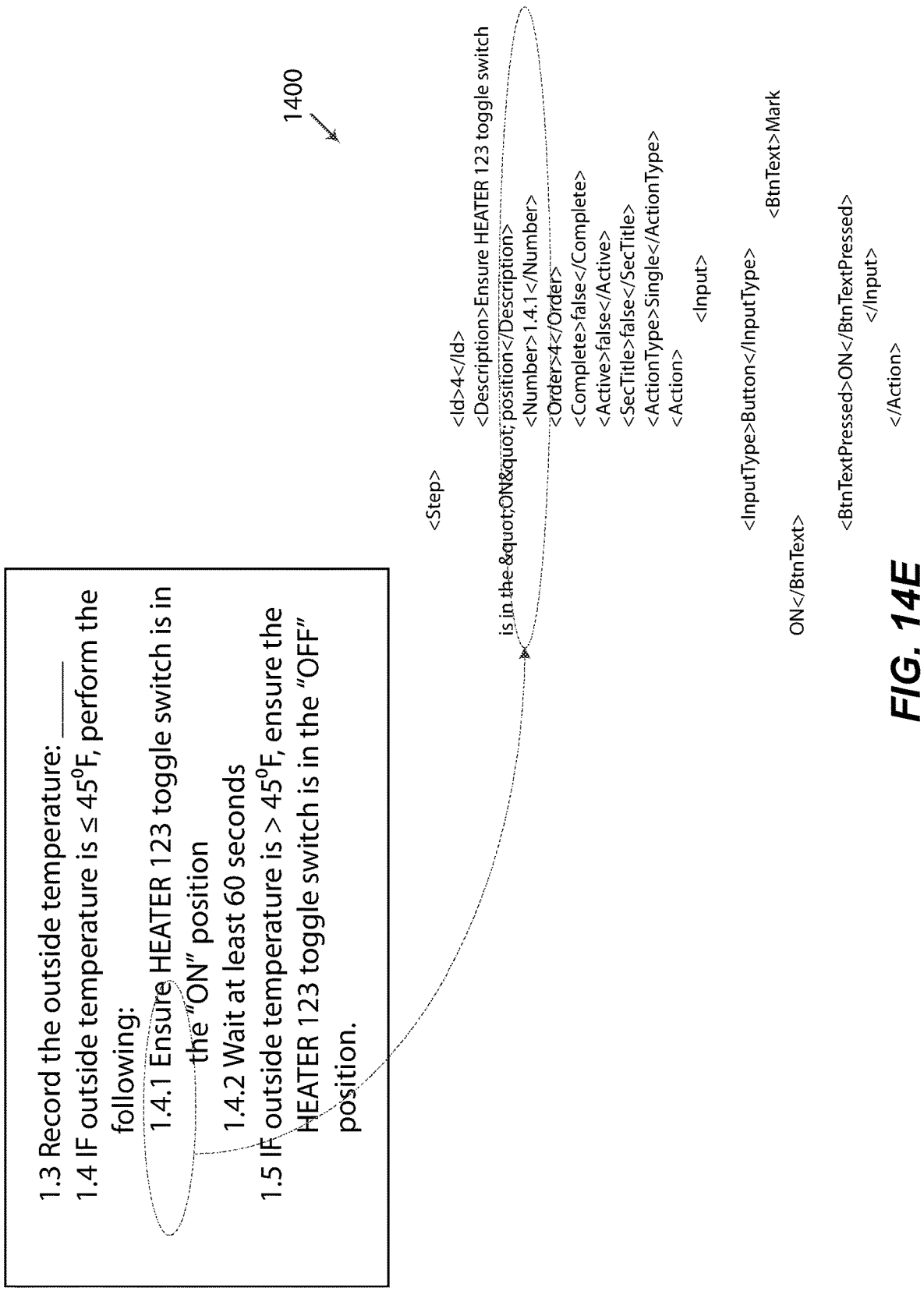

FIG. 14E shows a step number inserted into procedure data structure 1400.

FIG. 14F shows step text inserted into procedure data structure 1400.

FIG. 14G shows how a definition for feedback and interaction is presented through the user interface to ensure sound human performance—including place keeping, and expected as left state—and is inserted into procedure data structure 1400. This information is not explicitly described (i.e., it's implicit) in the paper procedure, and may be determined using rules based on industry conventions or best practices.

FIG. 14H shows a definition for a state for a place keeping step inserted into procedure data structure 1400. Here, place keeping step is not complete and not current active.

FIG. 14I shows a definition inserted into procedure data structure 1400 for an expected as left state is "On," which is presented on a button to provide a cue to an operator to remind him to perform the action before he/she marks it complete.

FIG. 14J shows a definition inserted into procedure data structure 1400 for feedback to an operator that he placed the switch to an "On" position.

FIG. 14K shows a step number inserted into procedure data structure 1400.

FIG. 14L shows a unique identifier independent of step number that is inserted into procedure data structure 1400 for referencing independent of a step number, and a pre-defined sequence (i.e., an order) defined based on what order a step appears in a procedure.

FIG. 14M shows step text inserted into procedure data structure 1400.

FIG. 14N shows a definition inserted into procedure data structure 1400 for how feedback and interaction is presented through a user interface to ensure sound human performance including place keeping and a timer to ensure that an instruction to wait at least 60 seconds is followed. This information (i.e., a timer) is not explicitly described in the paper procedure (i.e., is implicit).

FIG. 14O shows a step number inserted into procedure data structure 1400.

Figure 14P:
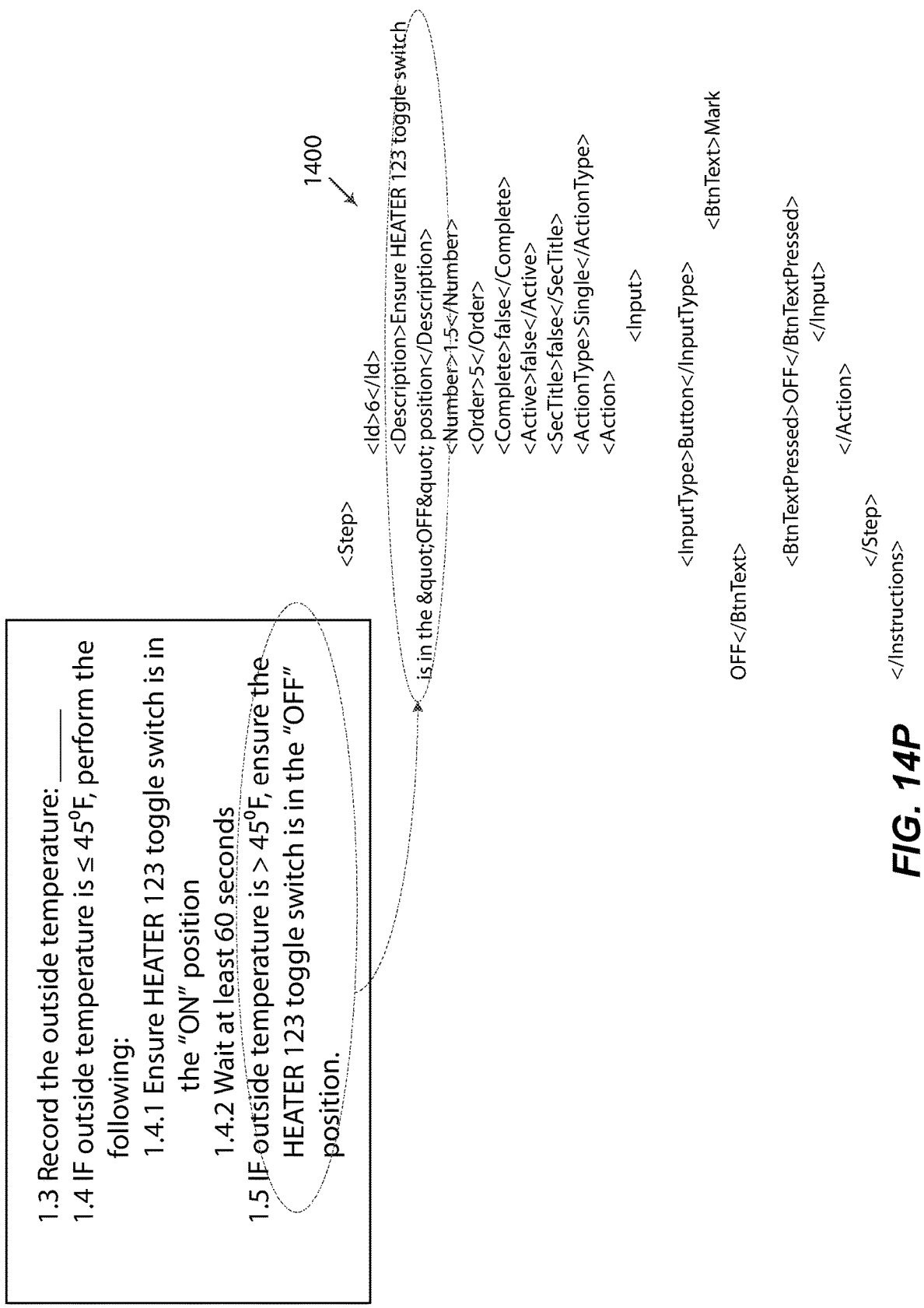

FIG. 14P shows descriptive text for conditional statements inserted into procedure data structure 1400.

Figure 14Q:
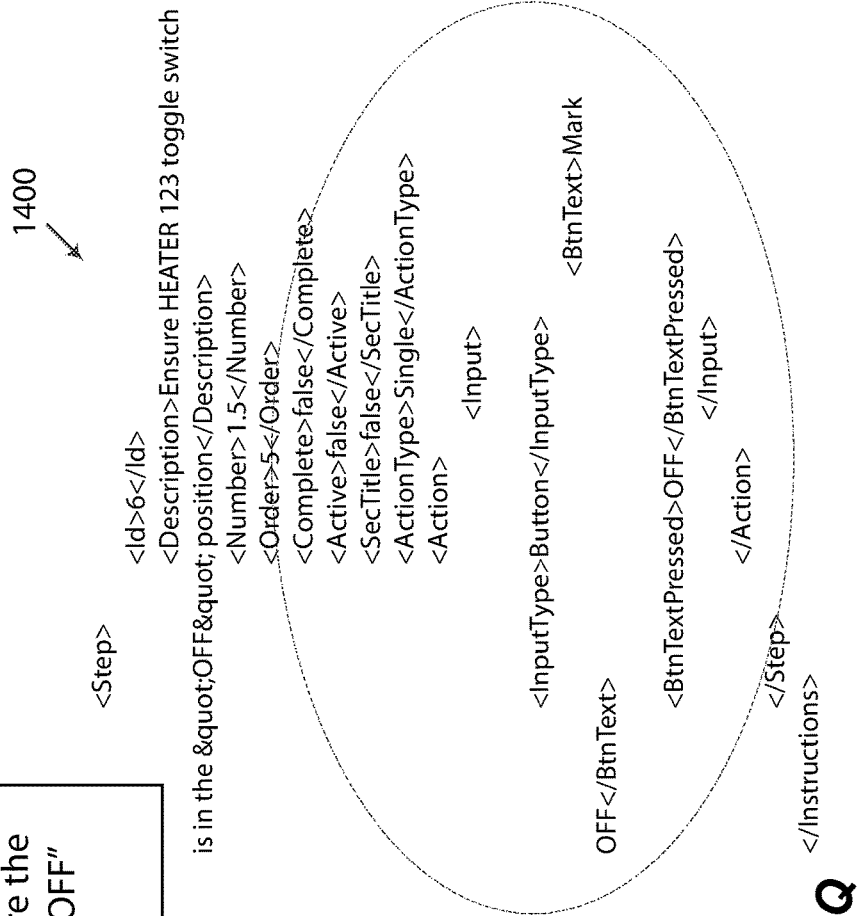

FIG. 14Q shows a definition inserted into procedure data structure 1400 for how feedback and interaction is presented through a user interface to ensure sound human performance including place keeping, and expected as left state. This information (i.e., the "expected as" state) is not explicitly described in the paper procedure (i.e., is implicit).

Dynamic procedure data structures described herein (or created as described herein) may be incorporated into CBP solutions to provide highly dynamic CBP solutions. The highly dynamic CBPs may be particularly appropriate for field instructions. Existing guidance is tailored toward control room procedures and may not be entirely applicable to field instructions. For example, the conventional guidance on use of CBP solutions in nuclear settings focuses on issues related to embedding process information in the CBP and how to handle soft control available through the CBP system. These are important issues for control room CBPs, but are not likely to be aspects of field CBPs due to the fact that many field CBPs address locally controlled equipment. Further, the existing guidance does not address ways to facilitate procedural compliance, or how to support coordination in the field. Examples of field tasks where such a CBP may be applicable include swapping exhaust and supply fan sets; preventive maintenance of chillers used as a part of the heating, ventilating, and air conditioning system; swapping auxiliary salt water pumps (including swapping of chlorination trains to match the ASW pump swap), and a battery and charger test and inspection.

By way of example, CBPs executing from dynamic procedure data structures described herein may lead to efficiency gains and human performance improvements. Such CBPs may minimize the risk of human error, improve human performance, and increase efficiency in the whole work process related to work packages (from planning, to task execution, to archiving). Such CBP system may reduce task execution time by, for example, streamlining the work flow by guiding the worker down the relevant path through the procedure, computerized aids (e.g., digital CCV and calculations), automatic place keeping, easy access of additional information, and automatic population of data tables. A worker in the field plays an important role for safe and efficient operation of the nuclear power plant. Historically, tools have been implemented to ensure tasks in the field are conducted correctly and consistently. However, the industry may have reached a saturation point where the added tools might have an unfortunate negative impact on human performance. Future field workers should have tools, such as the CBPs that use the dynamic procedure data structures, that make the job easier as well as safe and efficient.

Embodiments described herein enable highly dynamic computer-based systems that, for example, remind a user to perform a task, guide a user through performing a task, and confirm a user performed the task before permitting the user to perform a subsequent task. Procedures that are performed using these highly dynamic CBP may be performed with fewer errors and may be more likely to actually be completed.

The embodiments described herein may be embodied, wholly or partially, in one or more computer program products supplied on any one of a variety of computer readable media. The computer program product(s) may be embodied in computer language statements of the types already described herein.

The term "computer program product" is used to refer to a computer readable medium, as defined above, which has on it any form of software to enable a computer system to operate according to any embodiment of the invention. Software applications may include software for facilitating interaction with software modules, including user interface and application programming interfaces. Software may also be bundled, especially in a commercial context, to be built, compiled and/or installed on a local computer.

Additional non-limiting embodiments of the disclosure include:

Embodiment 1: a method of converting a static work procedure to a dynamic procedure, the method comprising: receiving raw text data associated with a static procedure, wherein the raw text data comprises groups of text; determining that a first group of text of the groups of text corresponds to an explicit action defined in the static procedure; determining explicit action characteristics responsive to the first group of text; determining that the first group of text corresponds to an implicit action defined in the static procedure responsive to one or more conventions, wherein the one or more conventions are associated with the static procedure; determining implicit action characteristics responsive to the first group of text; and creating a procedure task responsive to one or more of the explicit action characteristics and implicit action characteristics.

Embodiment 2: the method of Embodiment 1, wherein the determining that a first group of text of the groups of text corresponds to an explicit action defined in the static procedure comprises: searching the raw text data for syntax indicative of explicit actions, wherein the syntax indicative of explicit actions is selected from a group comprising: a warning, a conditional statement, an action task, a continuously applicable step, a branching task, and a timer; and identifying the explicit action and the first group of text responsive to the searching.

Embodiment 3: the method of Embodiments 1 and 2, wherein the determining explicit action characteristics responsive to the first group of text further comprises: identifying at least one sub-process associated with a type of the explicit action; and performing the at least one sub-process on the first group of text.

Embodiment 4: the method of any of Embodiments 1 to 3, wherein the performing the at least one sub-process on the first group of text comprises calling a conditional statement conversion sub-process configured to process the first group of text by: creating one or more binary conditional statements representative of a conditional statement of the explicit action; creating a decision point and at least two decision options; associating the decision point with the one or more binary conditional statements; and identifying a next applicable task for each of the at least two decision options.

Embodiment 5: the method of any of Embodiments 1 to 4, wherein the creating the procedure task responsive to one or more of the explicit action characteristics and implicit action characteristics comprises creating a data structure comprising: the binary conditional statement; the decision point; the at least two decision options; and references to the next applicable task for each of the at least two decision options.

Embodiment 6: the method of any of Embodiments 1 to 5, wherein the performing the at least one sub-process on the first group of text comprises calling a warning conversion sub-process configured to process the first group of text by: identifying other tasks associated with or effected by a warning defined in the first group of text; creating warning text representative of the warning, wherein the warning is selected from a group comprising: a notification, a caution statement, a warning statement; and creating links for presenting the warning text at the other tasks.

Embodiment 7: the method of any of Embodiments 1 to 6, wherein the creating the procedure task responsive to one or more of the explicit action characteristics and implicit action characteristics comprises creating a data structure comprising the warning text or the links for presenting the warning task at the other tasks.

Embodiment 8: the method of any of Embodiments 1 to 7, wherein the performing the at least one sub-process on the first group of text comprises calling an action conversion sub-process configured to process the first group of text by determining an action to be taken on a component.

Embodiment 9: the method of any of Embodiments 1 to 8, wherein the creating the procedure task responsive to one or more of the explicit action characteristics and implicit action characteristics comprises creating a data structure comprising a component identifier, and an action statement.

Embodiment 10: the method of any of Embodiments 1 to 9, wherein the performing the at least one sub-process on the first group of text comprises calling a continuously applicable task conversion sub-process configured to process the first group of text by: identifying one or more conditions where the procedure task is applicable; and creating one or more references to the conditions where the procedure task is applicable.

Embodiment 11: the method of any of Embodiments 1 to 10, wherein the creating the procedure task responsive to one or more of the explicit action characteristics and implicit action characteristics comprises creating a data structure comprising the one or more references to the conditions where the procedure task is applicable.

Embodiment 12: the method of any of Embodiments 1 to 11, wherein the performing the at least one sub-process on the first group of text comprises calling a branching task conversion sub-process configured to process the first group of text by: identifying one or more branching criteria; identifying one or more sections of the static procedure or another procedure that are a branching target; create a branching operation associated with the branching criteria and the branching target; and create a decision point and associate the decision point with the branching operation.

Embodiment 13: the method of any of Embodiments 1 to 12, wherein the creating the procedure task responsive to one or more of the explicit action characteristics and implicit action characteristics comprises creating a data structure comprising: the branching criteria; the branching targets; the decision point; the decision point statement; and the branching operation.

Embodiment 14: the method of any of Embodiments 1 to 13, wherein the determining that the first group of text corresponds to an implicit action defined in the static procedure responsive to one or more conventions comprises: identifying a procedure characteristic associate with a convention of the one or more conventions, wherein the procedure characteristic is selected from a group comprising: a dependency on a previous action, using previously recorded information, associating additional information, a peer check is required, independent verification is required, correct component verification, and sign-offs are required; and creating an implicit action responsive to the procedure characteristics.

Embodiment 15: a computer system for converting a work procedure into structured data, the system comprising: one or more database stores having stored thereon a first database, wherein the database comprises tasks associated with one or more work procedures; and a data processing system operative to be executed as a procedure content processing system responsive to receiving content associated with a procedure, the procedure content processing system including: a procedure content input configured to receive the content; a procedure contextualizer configured to determine procedure-specific information from the content; a task converter configured to receive a task associated with the procedure and convert the task to a dynamic task; and a structured data builder configured to map dynamic elements of the dynamic task to a procedure data structure.

Embodiment 16: a method of training a learned classification model for use by a data processing system to analyze a written procedure, the method comprising: receiving content corresponding to one or more written procedures, the content comprising raw text; training a learned classification model to classify text using a classified data list; and updating, using a multi-tuning process, the classified data list used to train the learned classification model.

Embodiment 17: the method of Embodiment 16, wherein updating, using a multi-tuning process, the classified data list used to train the learned classification model comprises: determining first new classifications present in the raw text; determining first candidate data for the initial classified data list by using the first new classifications and text classified by the learned classification model; and creating an updated classified data list responsive to the first candidate data.

Embodiment 18: the method of Embodiments 16 and 17, further comprising iteratively creating subsequent classified data lists and iteratively training the learned classification model using the subsequent trained classified data lists until a stop condition is detected.

Embodiment 19: the method of any of Embodiments 16 to 18, wherein detecting the stop condition comprises detecting that no further text of corresponding to a written document may be classified responsive to the learned classification model or a predetermined threshold for a generic classified data list has been realized.

Embodiment 20: the method of any of Embodiments 16 to 19, wherein determining first new classifications present in the raw text comprises performing clustering on the raw text and determining the new classifications responsive to the clustering, wherein the new classifications are configured to identify text having lower dimensionality than at least some text comprising the initial classified data list.

Embodiment 21: the method of any of Embodiments 16 to 20, wherein updating, using a multi-tuning process, the classified data list used to train the learned classification model comprises: performing clustering on dictionary text to identify dictionary words and bins of dictionary words having lower dimensionality of at least some words comprising the initial classified data list; and updating the initial classified data list using the dictionary words and bins of dictionary words.

Embodiment 22: the method of any of Embodiments 16 to 21, wherein updating, using a multi-tuning process, the classified data list used to train the learned classification model comprises increasing one or more confidence factors associated with the classified data list responsive to the dictionary words and bins of dictionary words.

Embodiment 23: a system for training a learned classification model for use by a data processing system to analyze a written procedure, the system comprising: a supervised learner configured for training a learned classification model using an initial classified data list and raw text; an unsupervised learning configured for: determining first new classifications present in the raw text; and determining first candidate data for the initial classified data list responsive to the first new classifications and the learned classification model; and a classified data list updater configured for creating a first updated classified data list responsive to the second candidate data.

Embodiment 24: the system of Embodiment 23, wherein: the supervised learner is further configured for training the learned classification model using the first updated classified data list and the raw text; and the unsupervised learner is configured for: determining second new classifications preset in the raw text; determining second candidate data for the trained classified data list responsive to the second new classifications and the learned classification model; and the classified data list updater is configured for creating a second updated classified data list responsive to the second candidate data.

Embodiment 25: the system of Embodiments 23 and 24, wherein the supervised learner is further configured for iteratively training the learned classification model using subsequent trained classified data lists created by the classified data list updater until a stop condition is detected.

Embodiment 26: the system of any of Embodiments 23 to 25, wherein detecting the stop condition comprises detecting that no further text of corresponding to a written document may be classified responsive to the learned classification model.

Embodiment 27: the system of any of Embodiments 23 to 26, further comprising: a second unsupervised learner configured for determining classifications present in dictionary text; and a classified data list updater configured for: determining one or more of dictionary words and bins of dictionary words present in the dictionary text responsive to the classifications determined by the second unsupervised learner; comparing the classified data list with one or more of the dictionary words and bins of dictionary words; and creating a second updated classified data lists responsive to the comparing.

Embodiment 28: a method for creating a procedure data structure from a written procedure, the method comprising: receiving procedure content corresponding to a written procedure; identifying syntax in the procedure content; identifying tasks responsive to the procedure content and identified syntax; creating a data structure for the identified tasks; and mapping the identified tasks to the data structure.

Embodiment 29: the method of Embodiment 28, wherein the identifying tasks responsive to the procedure content and identified syntax comprises comparing the identified syntax to a list of classified text.

Embodiment 30: the method of Embodiments 28 and 29, wherein the identifying tasks responsive to the procedure content and identified syntax comprises: searching for indirect word occurrences responsive to a classified data list; and determining, responsive to the search, a classification criteria for classification aggregation processes.

Embodiment 31: the method of any of Embodiments 28 to 30, wherein the searching for indirect word occurrences responsive to the classified data list comprises performing a supervised learning process, the supervised learning process selected from a group consisting of Naive Bayes, Support Vector Machine, Decision tree, Radial Basis Function, AdaBoost, and Random Forest.

Embodiment 32: the method of any of Embodiments 28 to 31, wherein the searching for indirect word occurrences responsive to the classified data list comprises determining a candidate word responsive to a presence of contextual words near the candidate word in the procedure content, the contextual words identified responsive to the classification criteria.

Embodiment 33: the method of any of Embodiments 28 to 32, further comprising determining one or more context-independent words of the procedure content, and ignoring the one or more context-independent words.

Embodiment 34: the method of any of Embodiments 28 to 33, wherein determining one or more context-independent words comprises determining high-frequency words of the procedure content; determining high-frequency words that have widespread occurrence in the procedure content; and determining the high-frequency word having widespread occurrence that have a low correlation to other words of the procedure content.

Embodiment 35: the method of any of Embodiments 28 to 34, further comprising expanding a classified data list responsive to the indirect word occurrences.

Embodiment 36: the method of any of Embodiments 28 to 35, further comprising determining classification criteria for unclassified words of the procedure content.

Embodiment 37: the method of any of Embodiments 28 to 36, wherein determining classification criteria for the unclassified words of the procedure content comprises: performing association clustering of the unclassified words of the procedure content; and expanding a classification definition responsive to the performing association clustering.

Embodiment 38: the method of any of Embodiments 28 to 37, wherein expanding the classification definition responsive to the determined classification contexts comprises: determining a classification variable; determining a classification for at least one unclassified word responsive to the classification variable; determining classification criteria responsive to the at least one classified word; and creating an expanded classification definition responsive to the classification criteria and the classification definition.

Embodiment 39: the method of any of Embodiments 28 to 38, further comprising: analyzing the procedure content responsive to the expanded classification definition to identify candidate words; creating a new classified data list responsive to the candidate words; and training a learned classification model responsive to the new classified data list.

Embodiment 40: the method of any of Embodiments 28 to 39, further comprising iteratively creating subsequent classified data lists and training the learned classification model responsive to the subsequent classified data lists.

Embodiment 41: the method of any of Embodiments 28 to 40, further comprising: detecting that a first number of new classified words is less than a first threshold; and providing a current classified data list to a procedure conversion system for use as a generic classified data list for training classification models.

Embodiment 42: the method of any of Embodiments 28 to 41, further comprising: detecting that the procedure content has been fully classified; and storing a current classified data list at a relational database.

Embodiment 43: the method of any of Embodiments 28 to 42, wherein identifying tasks responsive to the procedure content and identified syntax comprises determining tasks responsive to a learned classification model, wherein the learned classification model was trained using classification data selected, at least in part, based on meeting classification criteria of a classification definition.

Embodiment 44: the method of any of Embodiments 28 to 43, wherein the classifications criteria comprises one or more of: a decision point, a recorded information, a needed relevant information, a sign-off requirement, an independent verification requirement, a note, a caution, a warning, a conditional statement, an action, a continuously applicable task, a branching task, and a timer.

Embodiment 45: the method of any of Embodiments 28 to 44, wherein the mapping the identified tasks to the data structure comprises matching a type of identified task to a task type of the data structure, and inserting data elements of the identified task into attributes of the data structure.

Embodiment 46: a system for creating a procedure data structure from a written procedure, the method comprising: a data store having thereon a first database and a second database, wherein the first database is configured to store trained classified data lists and the second database is configured to store convention configurations; and a data processing system operative to be executed as a procedure content processing system responsive to receiving content associated with a procedure, the procedure content processing system including: an explicit action classifier configured to identify and classify explicit actions of a task responsive to syntax of the task and a trained classification data list; and an implicit action classifier configured to identify implicit actions of a task responsive to one or more conventions associated with the procedure, the conventions being defined by the conventions configurations.

While the examples described in connection with the various embodiments herein have been related to industrial applications, one of ordinary skill in the art will understand that the various embodiments have broader applications, including converting written procedures for technical service orders, technical service procedures, technical troubleshooting, quality assurance, security protocols, medical safety protocols, hazardous waste disposal protocols, and more.

The features of the various embodiments described herein are not mutually exclusive and can exist in various combinations and permutations, even if such combinations or permutations are not expressly described herein, without departing from the scope of the disclosure. In fact, variations, modifications, and other implementations of what is described herein will occur to one of ordinary skill in the art without departing from the scope of the disclosure. As such, the invention is not to be defined only by the preceding illustrative description, but only by the claims which follow, and legal equivalents thereof.

We claim:

1. A method of converting a static procedure for performing a work procedure to a dynamic procedure for performing the work procedure, the method comprising:
receiving raw text data associated with a static procedure for performing a work procedure, wherein the raw text data comprises groups of text;

determining that a first group of text of the groups of text corresponds to an explicit action recited in the static procedure;

determining explicit action characteristics responsive to the first group of text;

determining a relevance of a convention or practice to the first group of text;

determining that the first group of text corresponds to an implicit action that is not recited in the static procedure responsive to rules associated with the convention or practice;

determining implicit action characteristics responsive to the first group of text; and creating a procedure task for a dynamic procedure responsive to one or more of the explicit action characteristics and implicit action characteristics, the dynamic procedure including instructions for guiding a user of a computer-based procedure system through explicit and implicit actions of the work procedure.

2. The method of claim 1, wherein the determining that a first group of text of the groups of text corresponds to an explicit action recited in the static procedure comprises:

searching the raw text data for syntax indicative of explicit actions, wherein the syntax indicative of explicit actions is selected from a group comprising: a warning, a conditional statement, an action task, a continuously applicable step, a branching task, and a timer; and identifying the explicit action and the first group of text responsive to the searching.

3. The method of claim 1, wherein the determining the explicit action characteristics responsive to the first group of text further comprises:

identifying at least one sub-process associated with a type of the explicit action; and performing the at least one sub-process on the first group of text.

4. The method of claim 3, wherein the performing the at least one sub-process on the first group of text comprises calling a conditional statement conversion sub-process configured to process the first group of text by:

creating one or more binary conditional statements that are representative of a conditional statement of the explicit action;

creating a decision point and at least two decision options;

associating the decision point with the one or more binary conditional statements; and identifying a next applicable task for each of the at least two decision options.

5. The method of claim 4, wherein the creating the procedure task responsive to one or more of the explicit action characteristics and implicit action characteristics comprises creating a data structure comprising:

the one or more binary conditional statements;
the decision point;
the at least two decision options; and
references to the next applicable task for each of the at least two decision options.

6. The method of claim 3, wherein the performing the at least one sub-process on the first group of text comprises calling a warning conversion sub-process configured to process the first group of text by:

identifying other tasks associated with or effected by a warning defined in the first group of text;

creating a warning text representing the warning, wherein the warning is selected from a group comprising: a notification, a caution statement, a warning statement; and creating links for presenting the warning text at the other tasks.

7. The method of claim 6, wherein the creating the procedure task responsive to one or more of the explicit action characteristics and implicit action characteristics comprises creating a data structure comprising the warning text or the links for presenting the warning text at the other tasks.

8. The method of claim 3, wherein the performing the at least one sub-process on the first group of text comprises calling an action conversion sub-process configured to process the first group of text by determining an action to be taken on a component.

9. The method of claim 8, wherein the creating the procedure task responsive to one or more of the explicit action characteristics and implicit action characteristics comprises creating a data structure comprising a component identifier, and an action statement.

10. The method of claim 3, wherein the performing the at least one sub-process on the first group of text comprises calling a continuously applicable task conversion sub-process configured to process the first group of text by:

identifying one or more conditions where the procedure task is applicable; and creating one or more references to the conditions where the procedure task is applicable.

11. The method of claim 10, wherein the creating the procedure task for the dynamic procedure responsive to one or more of the explicit action characteristics and implicit action characteristics comprises creating a data structure comprising the one or more references to the conditions where the procedure task is applicable.

12. The method of claim 3, wherein the performing the at least one sub-process on the first group of text comprises calling a branching task conversion sub-process configured to process the first group of text by:

identifying one or more branching criteria;

identifying one or more branching targets comprising sections of the static procedure or another procedure;

creating one or more branching operations associated with the one or more branching criteria and the one or more branching targets; and creating one or more decision points and associate the one or more decision points with the one or more branching operations.

13. The method of claim 12, wherein the creating the procedure task responsive to one or more of the explicit action characteristics and implicit action characteristics comprises creating a data structure comprising:

the one or more branching criteria;
the one or more branching targets;
the one or more decision points;
a decision point statement; and
the one or more branching operations.

14. The method of claim 1, wherein the determining that the first group of text corresponds to an implicit action that is not recited in the static procedure responsive to the convention or practice comprises:

identifying a procedure characteristic associated with the convention or practice, wherein the procedure characteristic is selected from a group comprising: a dependency on a previous action, using previously recorded information, associating additional information, a peer check is required, independent verification is required, correct component verification, and sign-offs are required; and creating an implicit action responsive to the procedure characteristic.

15. A method of training a learned classification model for use by a data processing system to analyze a written procedure, the method comprising:

receiving content corresponding to one or more written procedures, the content comprising raw text;

training, responsive to a classified data list, a first learned classification model to detect a presence of an explicit action recited in a written procedure;

training, responsive to the classified data list and rules of a convention or practice, a second learned classification model to detect a presence of an implicit action that is not recited in a written procedure; and updating, using a multi-tuning process, the classified data list used to train the first and second learned classification models.

16. The method of claim 15, wherein updating, using a multi-tuning process, the classified data list used to train the first and second learned classification models comprises:

determining first new classifications present in the raw text;

determining first candidate data for the classified data list by using the first new classifications and text classified by the first and second learned classification models; and creating an updated classified data list responsive to the first candidate data.

17. The method of claim 16, further comprising iteratively creating subsequent classified data lists and iteratively training the first and second learned classification models using the subsequent classified data lists until a stop condition is detected.

18. The method of claim 17, wherein detecting the stop condition comprises detecting that no further text corresponding to a written document may be classified responsive to the first and second learned classification models or a predetermined threshold for a generic classified data list has been realized.

19. The method of claim 16, wherein determining first new classifications present in the raw text comprises performing clustering on the raw text and determining the first new classifications responsive to the clustering, wherein the first new classifications are configured to identify text having lower dimensionality than at least some text comprising the classified data list.

20. The method of claim 19, wherein updating, using a multi-tuning process, the classified data list used to train the first and second learned classification models comprises:

performing clustering on dictionary text to identify dictionary words and bins of dictionary words having lower dimensionality of at least some words comprising the classified data list; and updating the classified data list using the dictionary words and bins of dictionary words.

21. The method of claim 20, wherein updating, using a multi-tuning process, the classified data list used to train the first and second learned classification models comprises increasing one or more confidence factors associated with the classified data list responsive to the dictionary words and bins of dictionary words.

22. A system for training a learned classification model for use by a data processing system to analyze a written procedure, the system comprising:

a supervised learner configured for training a learned classification model using an initial classified data list and raw text, the initial classified data list comprising:

data bearing a first label indicative of a presence of an explicit action recited in a written procedure; and data bearing a second label indicative of a presence of an implicit action that is not recited in the written procedure and is associated with a convention or practice of a work of the written procedure;

an unsupervised learner configured to:

determine first new classifications present in the raw text; and determine a first candidate data for the initial classified data list responsive to the first new classifications and the learned classification model, the first candidate data bearing the first label or the second label; and a classified data list updater configured to create a first updated classified data list responsive to the first candidate data.

23. The system of claim 22, wherein:

the supervised learner is further configured for training the learned classification model using the first updated classified data list and the raw text; and the unsupervised learner is configured to:

determine second new classifications that are present in the raw text;

determine a second candidate data for a second updated classified data list responsive to the second new classifications and the learned classification model; and the classified data list updater is configured to create the second updated classified data list responsive to the second candidate data.

24. The system of claim 23, wherein the supervised learner is further configured to iteratively train the learned classification model using subsequently trained classified data lists created by the classified data list updater until a stop condition is detected.

25. The system of claim 24, wherein detecting the stop condition comprises detection of no further text corresponding to a written document may be classified responsive to the learned classification model.

26. The system of claim 22, further comprising:

a second unsupervised learner configured for determining classifications present in a dictionary text; and a classified data list updater configured to:

determine one or more of dictionary words present in the dictionary text and bins of dictionary words present in the dictionary text responsive to the classifications determined by the second unsupervised learner;

determine a relationship between the first updated classified data list and the one or more of dictionary words and bins of dictionary words determined to be present in the dictionary text; and create a second updated classified data lists responsive to the relationship.

27. A system for converting a static procedure for performing a work procedure to a dynamic procedure for performing the work procedure, the system comprising:

a non-transitory computer readable medium for storing a raw text data associated with a static procedure for performing a work procedure, wherein the raw text data comprises groups of text;

a first classifier configured to:
 determine that a first group of text of the groups of text corresponds to an explicit action recited in the static procedure; and
 determine explicit action characteristics responsive to the first group of text;

a second classifier configured to:
 determine a relevance of a convention or practice to the first group of text;
 determine that the first group of text corresponds to an implicit action that is not recited in the static procedure responsive to rules associated with the convention or practice; and
 determine implicit action characteristics responsive to the first group of text, and a task converter configured to create a procedure task for a dynamic procedure responsive to one or more of the explicit action characteristics and implicit action characteristics, the dynamic procedure including instructions for guiding a user of a computer-based procedure system through explicit and implicit actions of the work procedure.

* * * * *

UNITED STATES PATENT AND TRADEMARK OFFICE
CERTIFICATE OF CORRECTION

PATENT NO. : 11,126,789 B2  
APPLICATION NO. : 16/222730  
DATED : September 21, 2021  
INVENTOR(S) : Oxstrand et al.

It is certified that error appears in the above-identified patent and that said Letters Patent is hereby corrected as shown below:

In the Specification

| | | |
|---|---|---|
| Column 11, | Line 30, | change "list 125 include" to --list 126 include-- |
| Column 20, | Line 13, | change "ture$\leq$45 degrees" to --ture $\leq$45 degrees-- |
| Column 21, | Line 23, | change "an XML, document)" to --an XML document)-- |

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*